Jan. 12, 1965 R. M. BOWLER ETAL 3,164,852

MACHINES FOR SHAPING UPPERS OVER LASTS

Filed May 11, 1962 16 Sheets-Sheet 1

Inventors
Raymond M. Bowler
Donald B. McIlvin
James R. Stewart
Frank W. Wetherbee
By their Attorney
Vincent A. White Jan. 12, 1965 R. M. BOWLER ETAL 3,164,852

MACHINES FOR SHAPING UPPERS OVER LASTS

Filed May 11, 1962 16 Sheets-Sheet 2

Jan. 12, 1965 R. M. BOWLER ETAL 3,164,852

MACHINES FOR SHAPING UPPERS OVER LASTS

Filed May 11, 1962 16 Sheets-Sheet 14

MACHINES FOR SHAPING UPPERS OVER LASTS

Filed May 11, 1962 16 Sheets-Sheet 16

United States Patent Office 3,164,852

Patented Jan. 12, 1965

3,164,852

MACHINES FOR SHAPING UPPERS OVER LASTS

Raymond M. Bowler, Salem Depot, N.H., and Donald B. McIlvin, Danvers, James R. Stewart, Salem, and Frank W. Wetherbee, Hamilton, Mass., assignors to United Shoe Machinery Corporation, Boston, Mass., a corporation of New Jersey Filed May 11, 1962, Ser. No. 194,064

34 Claims. (Cl. 12—10.5)

This invention relates to machines for shaping uppers over lasts and more particularly is directed to machines for combining the pulling-over and lasting operations on the forepart of a shoe. The machine herein disclosed is intended for use in lasting shoes in which the uppers are loosely assembled on a last and have not been previously subjected to a pulling over operation. In some respects the machine is particularly suited to operate on shoes in which the lasting margins of the upper are secured by cement to an insole on a last in the course of the lasting operation. It is to be understood, however, that the various novel features of the invention are not limited to use in shoe machines of the type herein illustrated, nor to the manufacture of any particular type or style of shoe.

It is a general object of the invention to provide an improved machine for combining the pulling-over and lasting operations on the forepart of the shoe. In previous machines combining these operations, one problem encountered involved accessibility to an operator in the initial placement of the shoe to be operated upon relative to locating devices. This was due partly to the fact that the upper wiping instrumentalities are usually mounted closely adjacent to the locating means. This seldom creates a problem in a machine adapted solely for lasting uppers that have been previously located accurately on the last and secured at least partly in place. However, the uppers of shoes presented to the present machine are completely unsecured at the forepart and are generally outspread obscuring the outline of the last. For this reason the upper must usually be folded heelwardly to permit the operator to view the last and the locating devices in the machine. In addition, when the upper is folded back over the toe again so the margins thereof may be placed in grippers and tensioned over the last, the last is again obscured, making it difficult for the operator to adjust the position of the upper relative to the outline of the last. Thus, if the upper wiping means are located closely adjacent the supporting and locating devices, it is extremely difficult for an operator to manipulate the upper and locate the last properly in the machine.

Accordingly, a main feature of the invention involves mounting the wiping mechanism for movement to and from an open position substantially spaced from the last support and locating devices to facilitate placement of the shoe. After the last is located and the margin of the upper is placed in the grippers, the wiping mechanism is moved to a gaging position in which the wipers overlie the outline of the last and act as gages relative to which the position of the upper may be adjusted. After adjustment of the upper provision is made for moving the wipers heightwise from their gaging position to wipe the upper over the forepart of the last.

According to another feature of the invention, the last locating means include distributor plates which extend above the support forming abutments for locating the forepart of the shoe accurately in relation to the positions the wipers will assume in gaging position. Since the distributor plates extend above the shoe support they are in the path of movement of the wipers as they subsequently wipe the upper over the last. Thus, the distributors are mounted for yielding heightwise movement so as to press the upper outspread against the underside of the wipers as they are depressed by the wipers. The distributors are also adjustable both lengthwise and laterally of the support to accommodate various sizes and shapes of shoes as well as to vary the location of the last with respect to the wipers.

According to a further feature the distributors are mounted for bodily movement lengthwise away from the toe end of the last during the descent of the wipers for further spreading the upper along the underside of the wipers.

Another feature of the invention provides for synchronizing the action of the grippers as they are moved heightwise for tensioning the upper equally at opposite sides of the last. Prior to gripping the upper the grippers are positioned by the synchronizing means at the same heightwise level relative to the support. After the upper is gripped, the synchronizing means is retracted at a controlled rate insuring equal tensioning movements of the grippers. Thereafter the synchronizing means become inoperative to permit independent heightwise adjustment of the grippers. Operator controlled means are also provided to reactivate the synchronizing means to return the grippers to their initial positions so the tension on the upper may be uniformly released to permit adjustment of the upper.

The above and other features of the invention, together with novel details of construction and combinations of parts will now be described with reference to the drawings and thereafter particularly pointed out in the claims.

Figure 1:
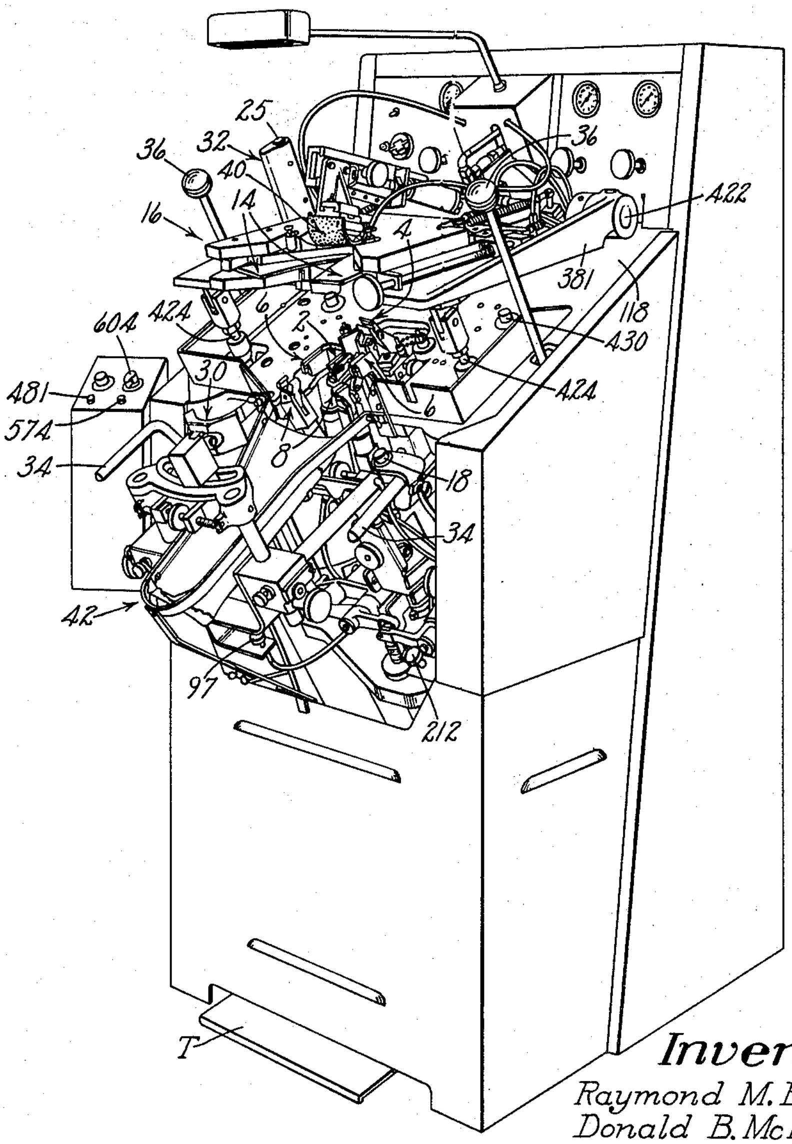
FIG. 1 is a perspective view of a pulling and lasting machine embodying the present invention.
Figure 2:
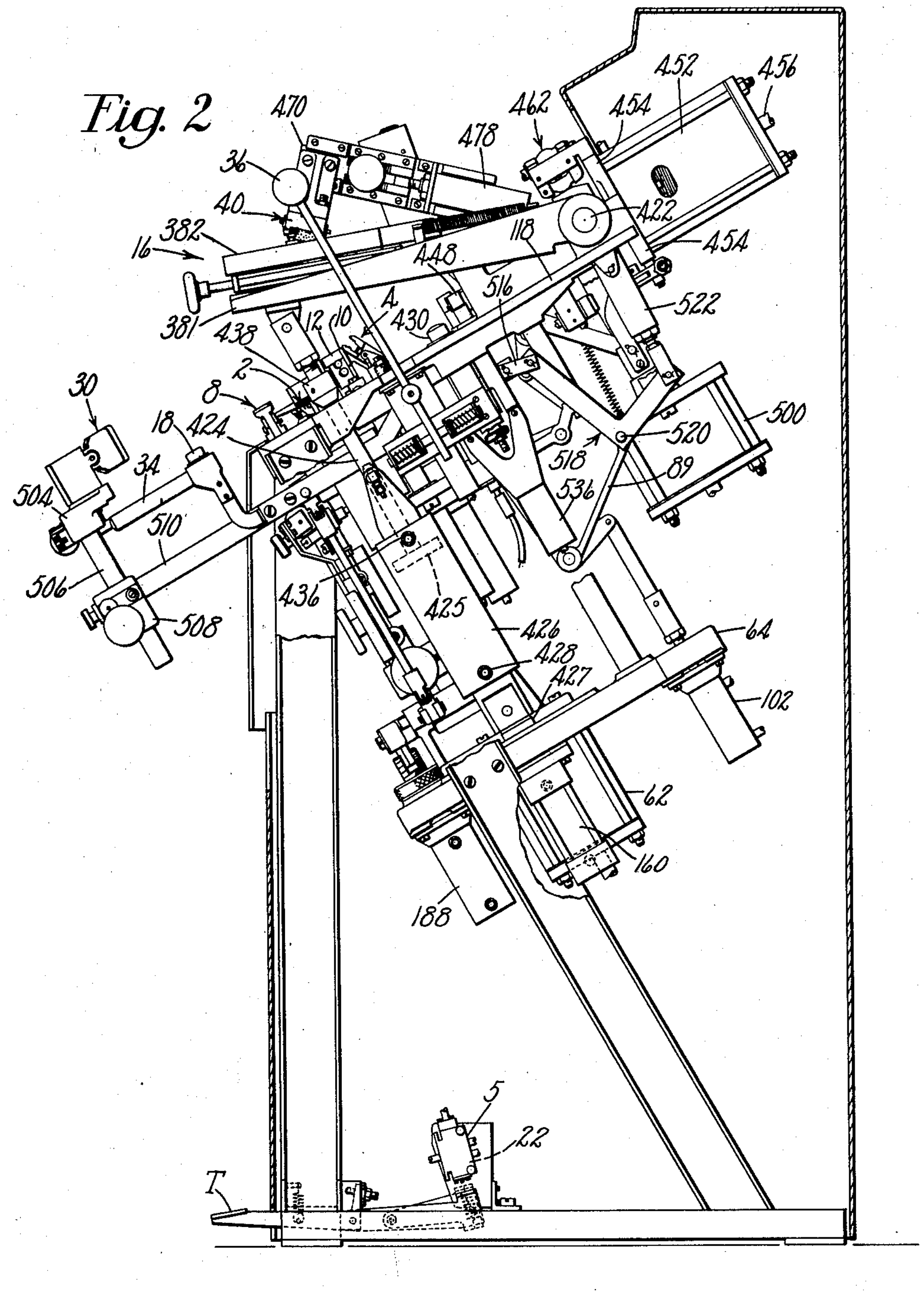
FIG. 2 is a side elevation of the machine with portions of the casing and frame broken away to illustrate the principal operating instrumentalities.

The machine illustrated in the drawings includes a shoe rest 2 (FIGS. 1 and 2) which supports the bottom of a last on which an upper is loosely assembled to position the last heightwise as well as to support it against the action on the upper of a toe gripper 4, a pair of side grippers 6 and a pair of ball grippers 8. For positioning lengthwise and widthwise, the forepart of the shoe is placed against a toe distributor 10, and a pair of side distributors 12, which also act on the shoe upper to distribute the material evenly as it is wiped heightwise around the forepart and widthwise over the bottom of the shoe by a pair of forepart wipers 14. The wipers are carried on a head 16 pivoted for swinging heightwise movement relative to the shoe in two stages. Initially the head 16 is in a raised open position as seen in FIGS. 1 and 2, so that the last may be placed on the support 2 and the upper inserted in the grippers. After the grippers exert a preliminary pull on the upper, the wiper head is swung down to a gaging position seen in FIG. 11 where the outline of the wipers 14 overlies the outline of the last and act as a visual gage to enable the operator to determine whether the upper is properly located on the last. Also at this time a heel clamp 30 is moved against the heel end of the shoe.

For correcting the position of the upper lengthwise of the last as outlined by the wipers the toe gripper 4 is adapted to be moved heightwise by a handle 32 provided with a push button 25 which upon depression also causes the grippers to open to permit shifting of their position on the upper. For correcting the position of the upper widthwise over the forepart of the last, the side grippers 6 are adapted to be moved heightwise independently by handles 34. The handle 34 is adjacent the right side of the machine and is provided with a push button 18 which upon depression causes both side grippers to be raised bodily relieving the tension on the upper to facilitate lengthwise adjustment of the upper by manipulation of the toe gripper. To correct the angular disposition of the tip line of the upper, the side grippers 6 are also arranged to be moved lengthwise of the shoe independently by movement of handles 36.

When the operator has completed correction of the upper the automatic portion of the machine cycle is initiated by depression of a start button 38. A toe pad 40 is moved down at this time into engagement with the forepart of the shoe to clamp the upper against the last with a relatively light pressure to prevent its displacement. The wiper head 16 is moved down from its gaging position so the wipers 14 wipe the upper heightwise about the forepart of the last and assume a final position below the shoe bottom. The wipers are then advanced and closed to wipe the tensioned upper inwardly over the edge of the last bottom. During such wiper movements, the grippers are released from the upper as soon as the wipers have sufficient control and the distributors also are depressed. Also at this time the shoe rest 2 is retracted so that the last is supported only by the wipers. As soon as the wipers arrive at their fully closed position, the force applied by the toe pad 40 is increased to exert a bedding pressure on the upper between the last and the wipers. After a predetermined interval the machine may be automatically opened to release the shoe which drops into a receptacle 42.

Figure 3:
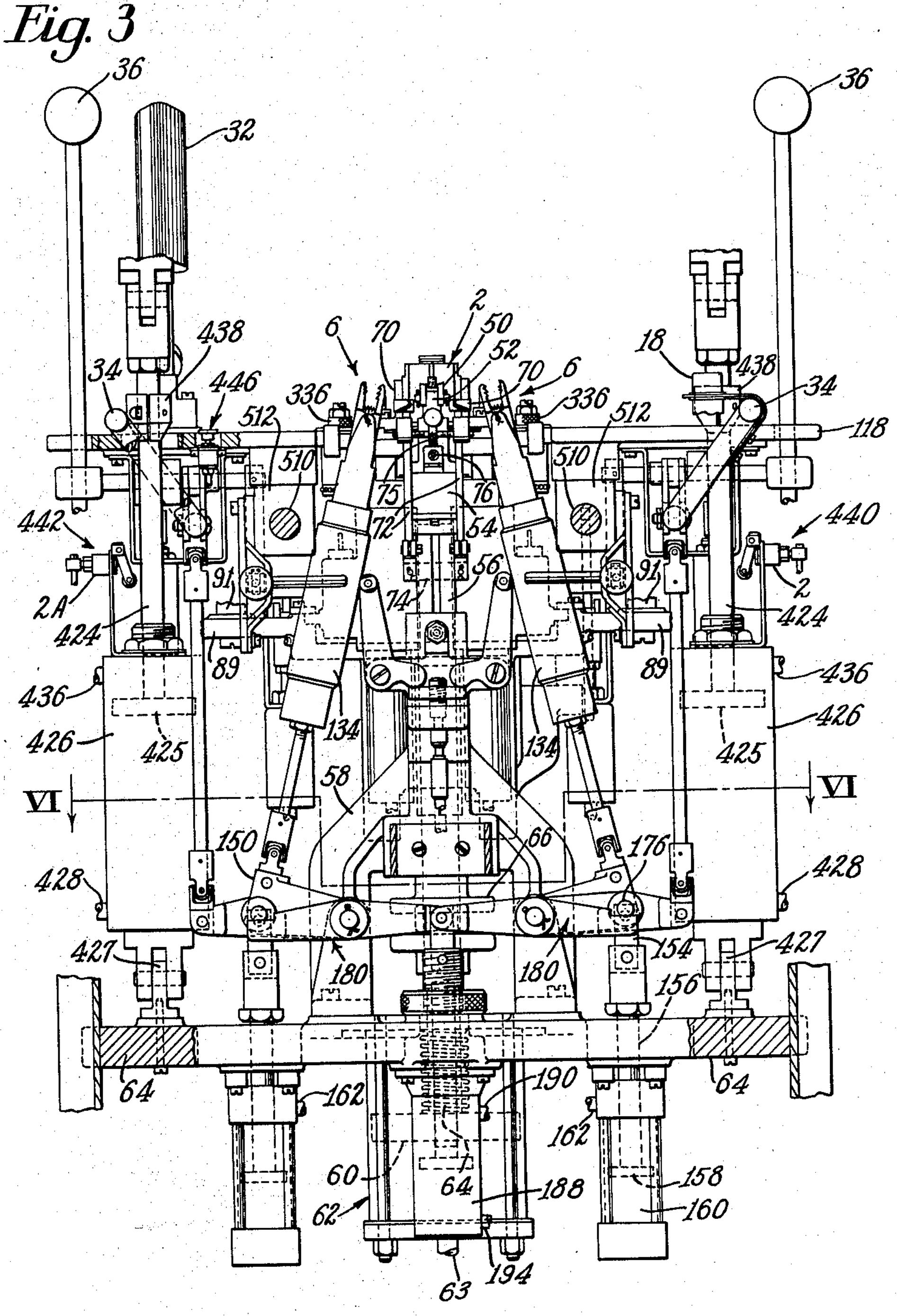
FIG. 3 is a front elevation of the machine on an inclined plane.

The shoe rest 2 which initially supports and positions the last includes a member 50 (FIG. 3) on which rests the bottom of a shoe to be operated on. The member 50 is carried by a bracket 52 fixed on the upper end of a cylinder 54 which is secured to the upper end of a post 56 mounted for heightwise sliding movements in suitable bearings in a frame 58. The lower end of the post has fixed thtereto a piston 60 movable in a cylinder 62 secured to the underside of a plate 64 which also carries the bracket 58. When the machine is at rest the shoe support member 50 is maintained in its uppermost position as seen in FIG. 3 due to the fact that the lower end of the cylinder 62 contains pressurized air introduced from a pipe 63. The air pressure acts on the piston 60 to hold the post 56 against the action of a spring 64 with a stop nut 66 threaded on the post, engaging a surface on the bracket 58 to determine the heightwise position of the member 50 and hence also to determine the position of the bottom of the shoe in the machine. The post 56 also carries a pair of curved fingers 70 adapted to hold the edges of an insole against the bottom of the last in the manner best seen in FIG. 5. The fingers are mounted on the upper ends of a pair of rods 72 (FIG. 3) each pivoted at their lower ends on a cross bar 74 so the widthwise positions of the fingers may be adjusted to suit a particular insole by rotation of a thumb screw 75 threaded into lugs extending from the rods. The cross bar 74 extends through a slot in the post 56 and is secured to a piston rod (not shown) extending down through a bore in the post from the cylinder 54. A spring (not shown) in the cylinder urges the bar 74 and fingers 70 heightwise to hold the edges of the insole against the bottom of the last. Introduction of pressurized air to the upper end of the cylinder 54 at the proper time in the machine cycle from a pipe 76 causes the fingers 70 to be depressed out of the path of movement of the wipers 14 as they close inwardly over the bottom of the shoe.

Figure 4:
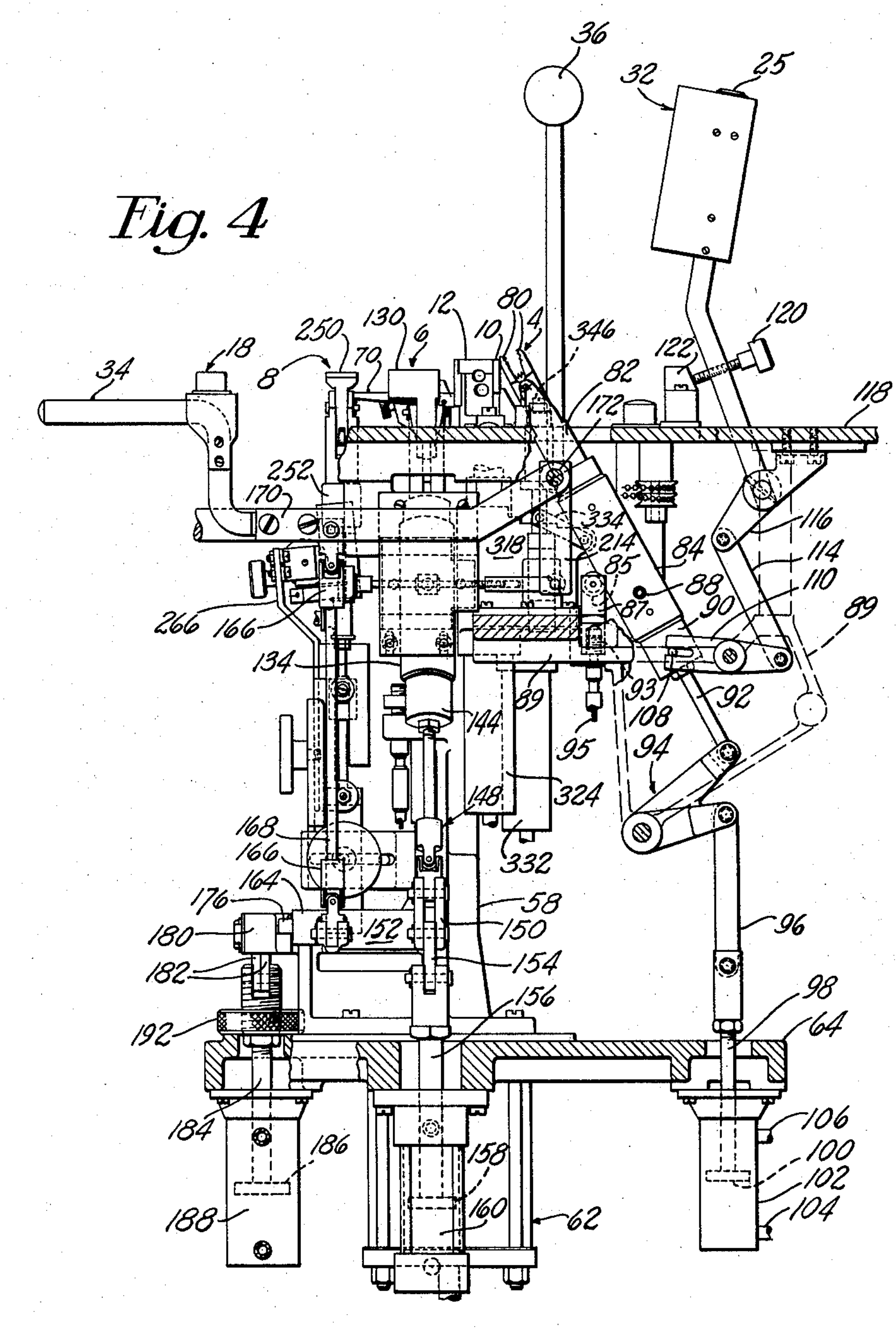
FIG. 4 is a side elevation partly in section of the mechanism shown in FIG. 3.
Figure 17A:
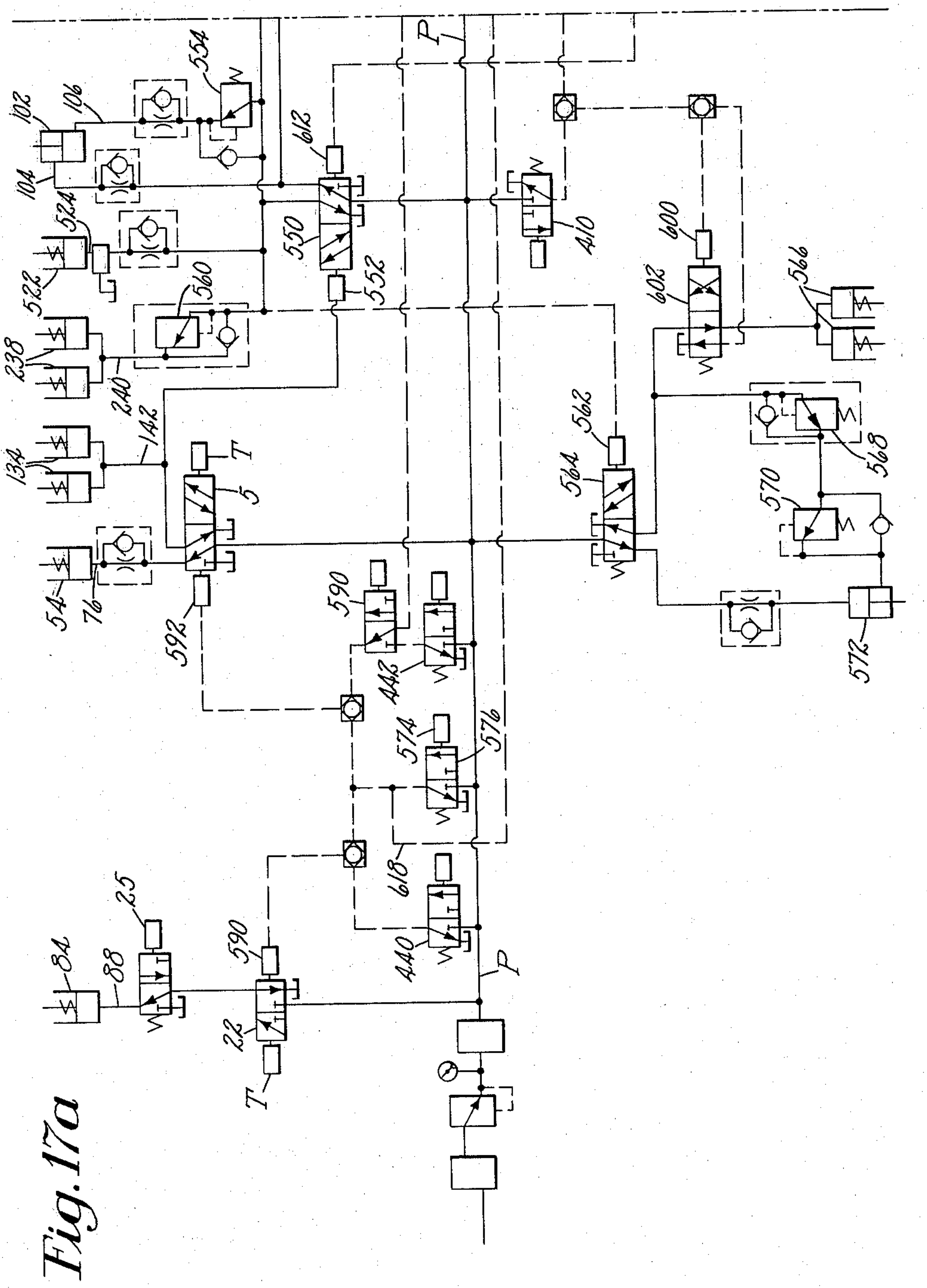
FIGS. 17*a* and 17*b* taken together form a diagram of the pneumatic control mechanism for the machine.

The toe gripper 4 includes two jaws 80 (FIG. 4) pivoted in the upper bifurcated end of a member 82 which forms an end cap of a cylinder 84. The jaws 80 are urged apart by a spring as seen in FIG. 4 to permit insertion of the shoe upper. The jaw members at their lower ends are provided with rolls engageable with a wedge (not shown). The wedge is formed on the upper end of a rod connected to a piston (not shown) received in the cylinder 84 and urged downwardly therein so that the jaws are normally open. Admission of pressurized air to the cylinder 84 from a pipe 88 causes the jaws 80 to close. The lower end of the cylinder 84 is closed by an end cap 90 which is connected by a rod 92 to one arm of a bell crank lever 94. The other arm of the lever 94 is connected by a link 96 and a rod 98 to a piston 100 received in a cylinder 102 secured to the underside of the plate 64. Air introduced into the lower end of the cylinder 102 from a pipe 104 acts on the piston 100 to raise the gripper 4 to the position shown in FIG. 4 ready to receive the upper at the toe end of the shoe. Admission of air to the cylinder 102 from a pipe 106 while exhausting air from the pipe 104 causes the cylinder 84 and grippers to be moved down bodily. For determining the heightwise position of the toe gripper 4, as well as for manually moving the gripper to correct the position of the upper on the last, the end cap 90 of the toe gripper cylinder 84 is provided with pins 108 (see also FIG. 9) which are received in slots in the bifurcated arm of a lever 110. The lever is pivoted on a frame 89 and has its other arm connected by a link 114 to an arm 116 fulcrummed on lugs extending downwwardly from a top plate 118 of the machine. The arm 116 has upstanding therefrom the toe gripper adjusting handle 32 which is provided with an adjustable stop screw 120 which abuts a lug 122 on the upper side of the plate 118 to determine the heightwise position of the toe gripper. It should be obvious that the toe gripper 4 may be raised or lowered from its initial position by adjusting the stop screw 120. As previously mentioned the handle 32 is provided with the push button 25 which operates a valve connected in series with the pipe 88 as seen in FIG. 17*a* to open and close the toe gripper during the correction stop of the machine.

Figure 9:
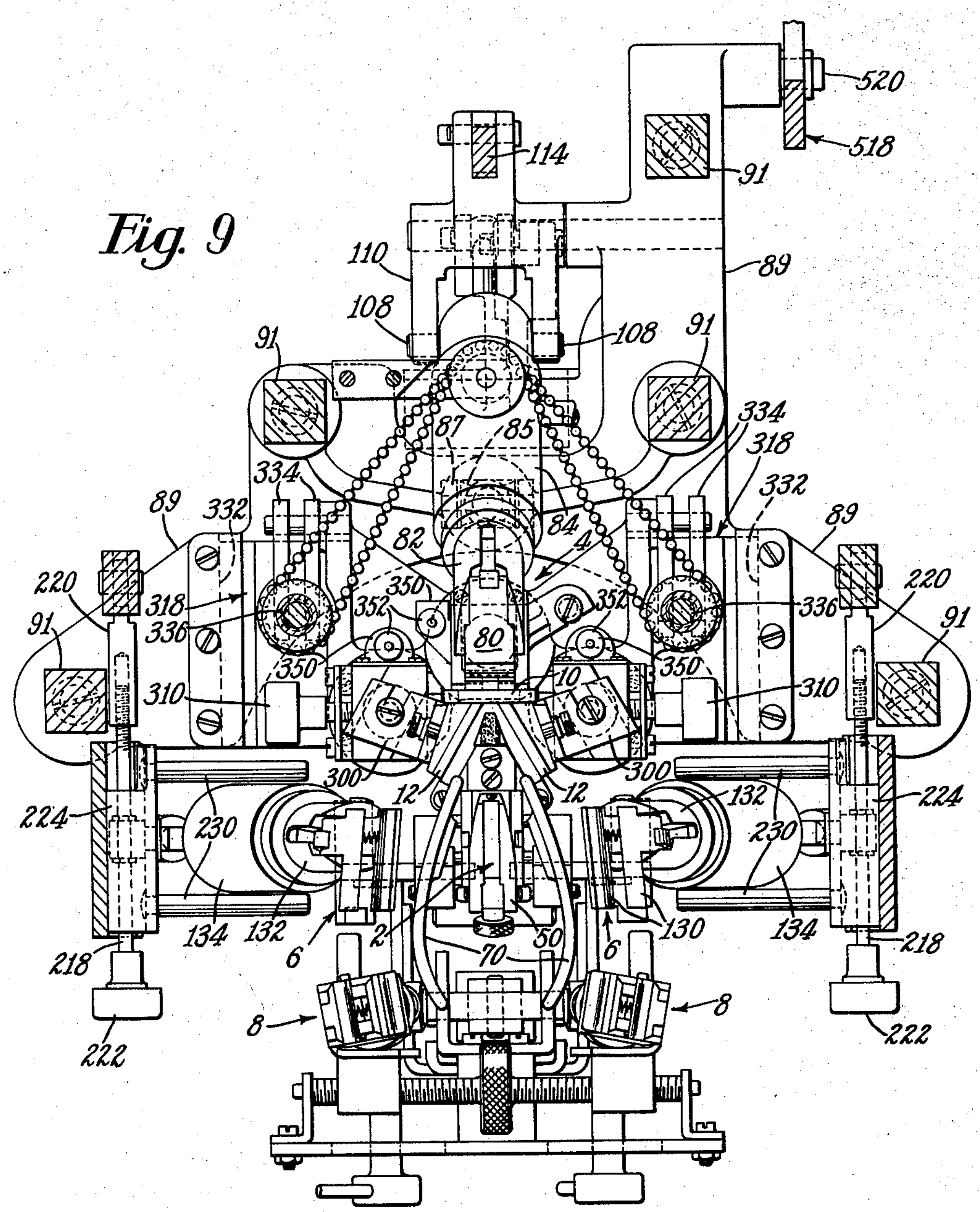
FIG. 9 is a plan view partly in section of the shoe support and distributor mechanisms.

The initial position of the toe gripper lengthwise of the toe end of the shoe positioned in the machine is determined by a concave roll 85 against which the toe gripper cylinder 84 rests. The roll 85 is carried on a rod 87 received for heightwise adjustment in a bore in the frame 89 which is secured to the top plate 118 by posts 91 (FIG. 9). The lower end of the rod 87 receives a screw 93 mounted for rotation and against axial movement in the frame. A flexible cable 95 connects the screw with a knob 97 (FIG. 1) at the front of the machine so that rotation of the knob by the operator acts to raise or lower the roll 85 to adjust the position of the toe grippers lengthwise.

Figures 5, 6:
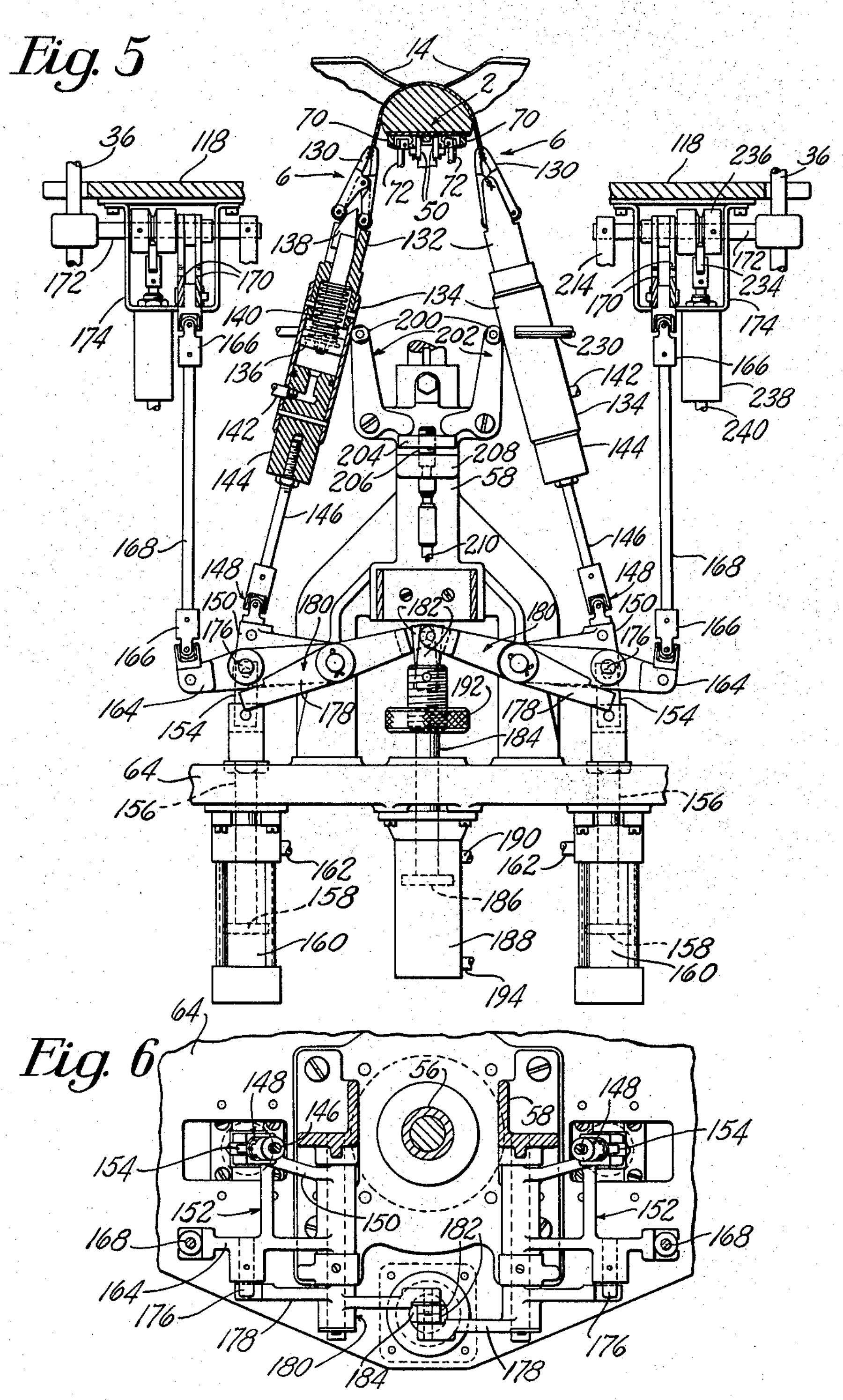
FIG. 5 is a view in front elevation partly in section showing the relative positions of the side gripper operating mechanisms during operation of the machine.
FIG. 6 is a section substantially on line VI—VI of FIG. 3.

Each of the side grippers 6 include jaws 130 (FIG. 5) which are pivoted on the upper bifurcated end of a member 132 forming an end cap of a cylinder 134. The cylinder receives a piston 136 to which is fixed a wedge 138 adapted to engage rolls on the lower ends of the jaw members 130. The piston is normally urged down in the cylinder by a spring 140 so the jaws are normally urged apart by a spring compressed between the jaws. By admitting air to both cylinders 136 from pipes 142, the pistons 136 of both cylinders are raised to close the jaws 130. The lower ends of the cylinders are closed by end caps 144 which are connected individually by rods 146 and universal joints 148 to arms 150 of composite levers 152 (FIG. 6). Each arm 150 is also connected by a link 154 to the upper end of a rod 156 fixed to a piston 158 received in a cylinder 160 fixed to the underside of the plate 64. By admitting air to the upper ends of both cylinders 160 from pipes 162, the pistons 158 are moved down to move the associated side grippers 6 down as units. Other arms 164 of the levers 152 are connected by universal joints 166 and rods 168 to arms 170 which have the handles 34 fixed thereto and which at their rearward ends are pivoted on shafts 172 journaled in U-shaped brackets 174 depending from the top plate 118. Thus, each handle 34 may be raised or lowered manually to adjust the heightwise position of its associated side gripper 6 to shift the position of the upper widthwise of the shoe during the correction stop of the machine. The arms 164 are also provided with pins 176 adapted to be engaged by flats on associated arms 178 of synchronizing levers 180 fulcrummed on axes common with the associated levers 152. The inner arms of both levers 180 are connected by links 182 to the upper end of a piston rod 184 fixed to a piston 186 received in a synchronizing cylinder 188 secured to the underside of the plate 64. Admission of fluid to the upper end of the cylinder 188 from a pipe 190 moves the piston 186 down until a stop nut 192 threaded on the upper end of the piston rod 184 engages a boss on the upper side of the plate 64. This action raises the outer ends of the levers 180 into engagement with the pins 176 to raise the side grippers 6 evenly to their initial positions ready to receive the margins of the upper. During the pulling cycle of the machine when the side grippers are closed on the upper and are moved down to tension the upper, air is admited to the cylinder 188 from a pipe 194 while air is exhausted from the pipe 190 to raise the piston 186 moving the outer ends of the levers 180 down. By referring to FIG. 17*b* it may be seen that the air is exhausted from the pipe 190 at a rate controlled by a throttle valve 191 while air is admitted to the cylinder from the pipe 194 at a rate controlled by a throttle valve 193. Thus, the synchronizing levers 180 are retracted at a controlled rate which by continued engagement with the pins 176 causes both side grippers to be moved down equally. In this manner the synchronizing cylinder acts in one direction to position the side grippers at the same initial upper receiving positions and also acts in the opposite direction to synchronize the tensioning movements of the grippers. As stated previously, depression of the push button 18 on the right-hand handle 34 causes both side grippers 6 to be raised to relieve tension on the upper permitting correction of the upper over the toe end. To this end the push button 18 operates a valve 195 to so operate a pilot valve 196 to reverse the connections to the pipes 190, 194 so that air is admitted to the cylinder 188 from the pipe 190 and exhausted from the pipe 194 to cause the outer ends of the levers 180 to raise the grippers 6 bodily against the action of the pulling cylinders 160. Releasing the push button reverses the connections to the pipes 190, 194 to retract the levers 180 to restore the effectiveness of the pulling cylinders 160.

Figure 7:
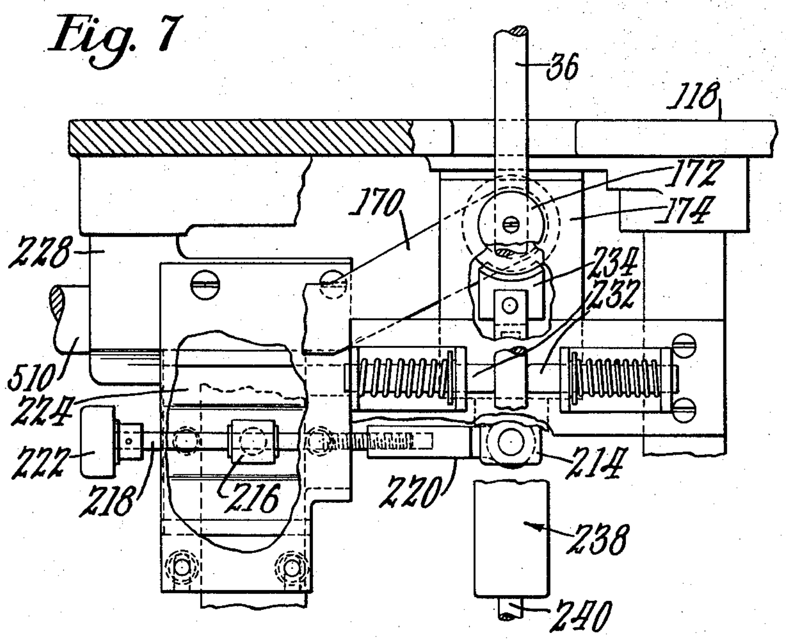
FIG. 7 is a side elevation of the side gripper adjusting mechanism seen in FIG. 5.
Figure 8:
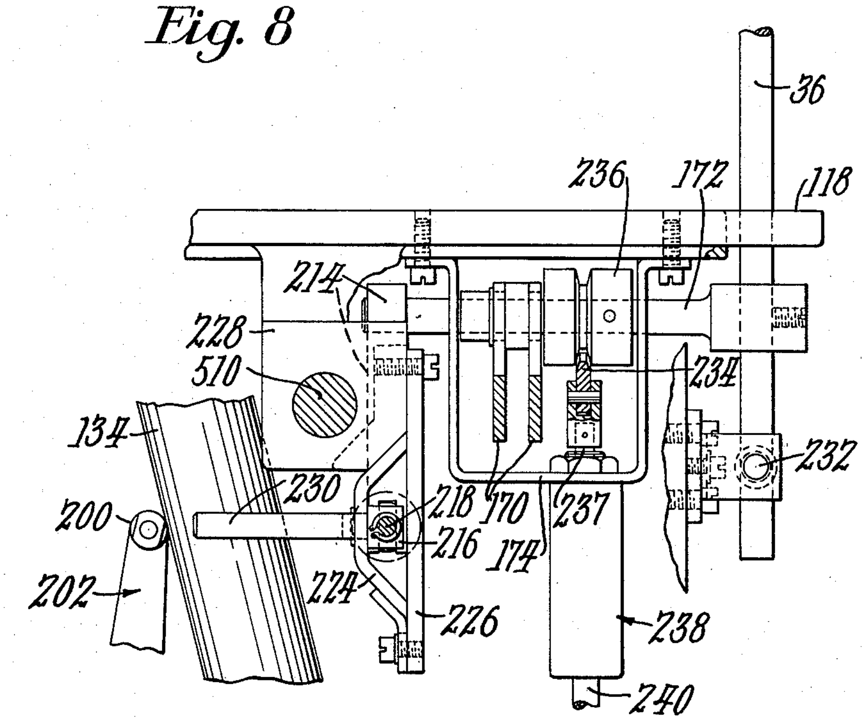
FIG. 8 is a front elevation of the mechanism shown in FIG. 7.

The side grippers 6 are adjustable toward and away from each other to accommodate various size shoes that may be operated on in the machine. To this end the side gripper cylinders 134 rest against rods 200 carried by upstanding arms of a pair of bell cranks 202 fulcrummed on lugs on the frame 58. The other arms of the bell cranks ride on the upper surface of a plate 204 through which is threaded a screw 206 fixed against axial movement in a lug 208 on the frame 58. The screw is rotated manually by means of a flexible cable 210 which connects the screw to a knob 212 (FIG. 1) at the front of the machine. By rotating the knob the operator raises or lowers the plate 204 which swings the bell cranks 202 to move the side grippers toward or away from each other to suit the shoe to be operated on. The side grippers are also adjustable independently lengthwise of the shoe by actuation of the handles 36 as previously mentioned. To this end each handle 36 is fixed to one of the shafts 172 which as above referred to is journaled in the bracket 174 (FIGS. 5, 7 and 8). The inner end of each shaft 172 has fixed thereto a depending arm 214 which is connected to a block 216 by an adjustable linkage which includes a rod 218 rotatably mounted in the block 216 and threaded into a block 220 pivoted on the arm 214. The rod 218 is provided with a knob 222 (FIG. 7) by which the linkage may be adjusted for a purpose which will presently appear. The block 216 is secured to a slide 224 guided for movements lengthwise of the shoe by guideways in a bracket 226 secured by means of a lug 228 to the underside of the top plate 118. The slide has projecting inwardly therefrom two rods 230 which straddle the body of the side gripper cylinder 134 associated therewith. Thus, by swinging the handles 36 fore and aft the side grippers may also be moved lengthwise of the shoe to correct the position of the upper. For maintaining side grippers in normal initial positions the handles 36 extend below the shaft 172 and are engaged by spring pressed plungers 232 which act on the handles to maintain them substantially in the positions illustrated in FIGS. 4 and 7. However, during the correction stop of the machine rotation of each shaft 172 and hence also movement of its associated handle 36 is resisted by a brake member 234 which is received in a groove in a collar 236 fixed to the shaft. The brake member is carried on the upper end of a piston rod 237 extending upwardly from a cylinder 238 secured to the bracket 174 and having a spring acting on a piston connected to the rod to maintain the brake member normally down and out of engagement with the collar 236. Admission of air to the lower end of the cylinder 238 from a pipe 240 raises the brake member 234 into engagement with the collar 236 with enough force resisting rotation of the shaft 172 so that while the handle 36 may be manually moved to shift the position of the side gripper it is not returned to a central position by the spring pressed plungers 232. In this manner the side grippers 6 are held by the action of the brake members 234 in the positions adjusted by the handles 36.

Figure 10:
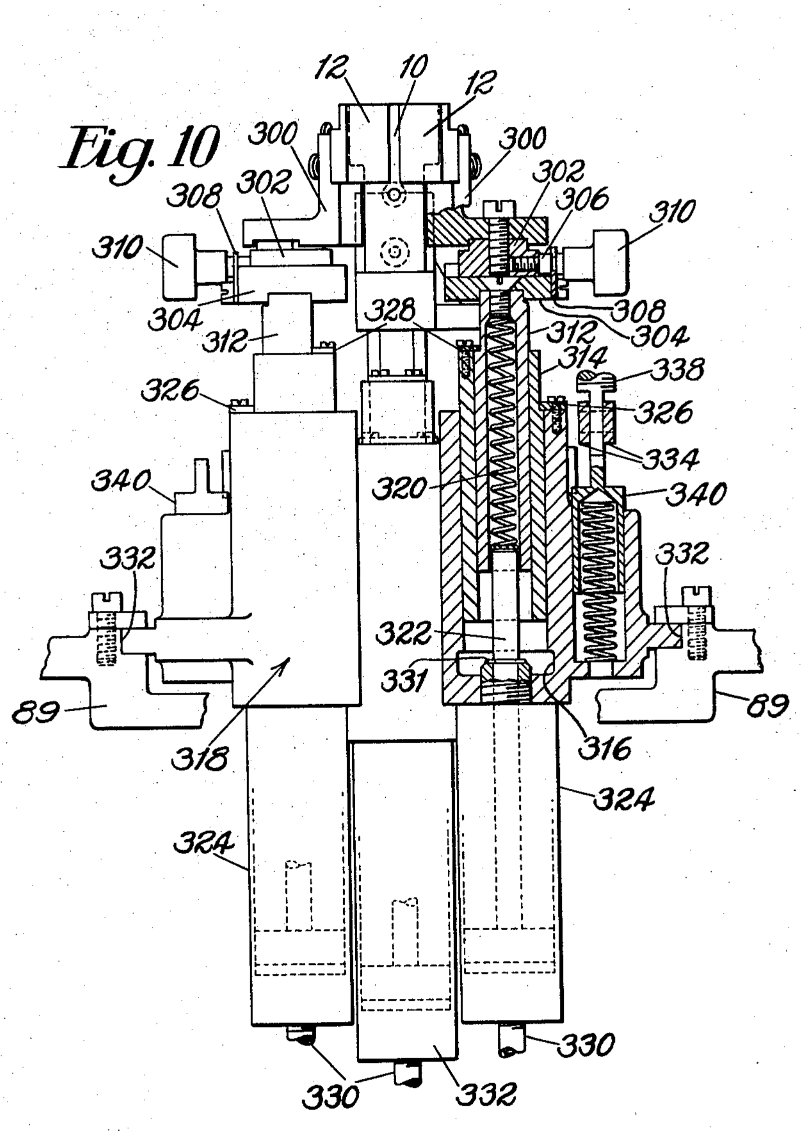
FIG. 10 is a front elevation of the distributor mechanism.
Figure 11:
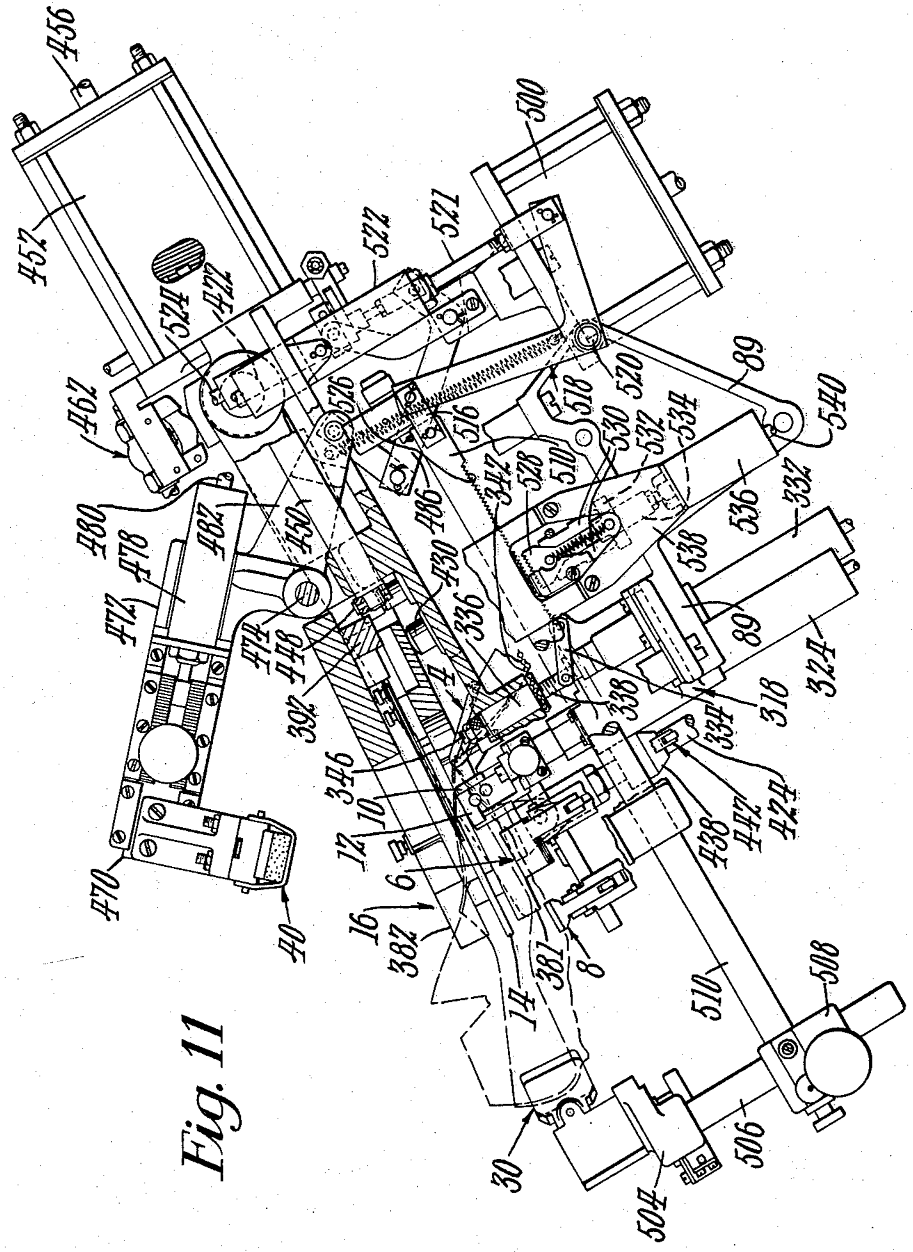
FIG. 11 is a section in side elevation of a portion of the mechanism shown in FIG. 2 and illustrating the wiper mechanism in gaging position.

The side distributors 12 each are detachably secured to an L-shaped member 300 (FIGS. 9 and10) fixed to a cross slide 302 mounted for widthwise adjustment in guideways of a block 304. For adjusting the distributors the slide receives the end of an adjusting screw 306 which is held against axial movement relative to the block 304 by a plate 308 secured to the block and received in an annular groove in the screw. Each screw 306 is provided with a knob 310 by which the operator may adjust the distributors inwardly toward each other from the positions shown in FIG. 10. Each block 304 is fixed to the upper end of a plunger 312 mounted for heightwise sliding movements in a sleeve 314 which in turn is carried in a bore 316 in a slide frame 318. The plunger 312 and hence also the distributor 12 is urged upwardly by a spring 320 in the plunger, the lower end of the spring being supported on the end of a piston rod 322 extending upwardly from a cylinder 324 secured to the underside of the frame 318. The sleeves 314 are retained in the bores 316 as well as against rotation by retaining plates 326 and the plungers 312 are retained similarly in the sleeves 314 by retaining plates 328 secured to the upper end of the sleeves. With the parts in the positions shown in FIG. 10, the spring 320 exerts a relatively light force to maintain the distributors 12 in their uppermost positions so that they serve to position the shoe widthwise in the machine. However, during the portion of the machine cycle when the wipers 14 are moving downwardly the distributors engage and press the outspread upper against the underside of the wipers to assist in eliminating undesirable wrinkles in the upper. At this time air is admitted to the lower ends of the cylinders 324 from pipes 330 raising the piston rods 322 until a ring 331 fixed thereto engages the underside of the plunger 312 so that a greater upward force is exerted against the upper by the distributors 12. The toe distributor 10 is mounted on the slide frame 318 in a fashion similar to the mounting of the side distributors except that its L-shaped mounting member corresponding to the members 300 for the side distributors is fixed directly to the top of a plunger corresponding to the plungers 312, there being no provision for adjusting the toe distributor in a horizontal direction. The pressure cylinder for the toe distributor is identified by the reference character 332 solely for the purpose of distinction, pressure being admitted thereto from the same pipes 330 so that additional pressure is exerted by the toe and side distributors simultaneously. During the downward movement of the wipers 14, the toe and side distributors are moved lengthwise of the shoe away from the toe end. This movement not only moves the distributors away from positions where they would interfere with the action of the wipers on the upper, but also causes the distributors to spread the upper additionally by a plowing action along the underside of the wipers. To this end, the slide frame 318 is mounted for sliding movement lengthwise of the shoe in guideways 332 formed in the frame 89. The slide frame 318 is connected by links 334 (see also FIGS. 11, 12 and 14) to a pair of plungers 336 by rods 338 threaded in the plungers. The plungers are mounted for heightwise movement in bores in the top plate 118. Spring pressed plungers 340 (FIGS. 10 and 14) mounted in the frame 318 bear against the bottoms of the threaded rods 338 to raise the plungers 336 until one side of pulleys 342 on the plungers engage the underside of bosses on the top plate 118 as seen in FIG. 11. In this position a knurled portion 344 of the plunger 336 projects above the top plate 118 as seen in FIG. 11. The knurled portion of the plunger has projecting therefrom a screw 346 locked in adjusted position by a lock nut engaging the upper side of the knurled portion. During downward movement of the wipers the underside of th ewiper head 16 engages the screws 346 depressing the plungers 336 causing the links 339 to assume the positions shown in FIGS. 12 and 14, to move the slide frame 318 and hence also the toe and side distributors lengthwise away from the toe end of the last. For adjusting the initial lengthwise position of the distributors the plungers 336 are manually rotated by the operator to move the rods 338 axially in the plungers to raise or lower the ends of the links 334 connected thereto causing movement of the slide frame 318. The pulley portions 342 of the plungers are interconnected for equal rotational movement by a chain 348 so that both plunger rods are adjusted equally.

During the closing inwiping movements of the wipers, the distributors are retracted to avoid interference with portions of the wiper mechanism. To this end each of the distributor carrying members have secured thereto by means of a bracket 350 (FIG. 9) a cylinder 352 having an upstanding piston rod adapted to engage the underside of the wiper head 14 in its lowermost position. Admission of air simultaneously to each of the cylinders 352 from pipes 354 acts to move the distributors down at the same time. To permit such action, air is exhausted simultaneously from the distributor pressure cylinders 324.

Figure 13:
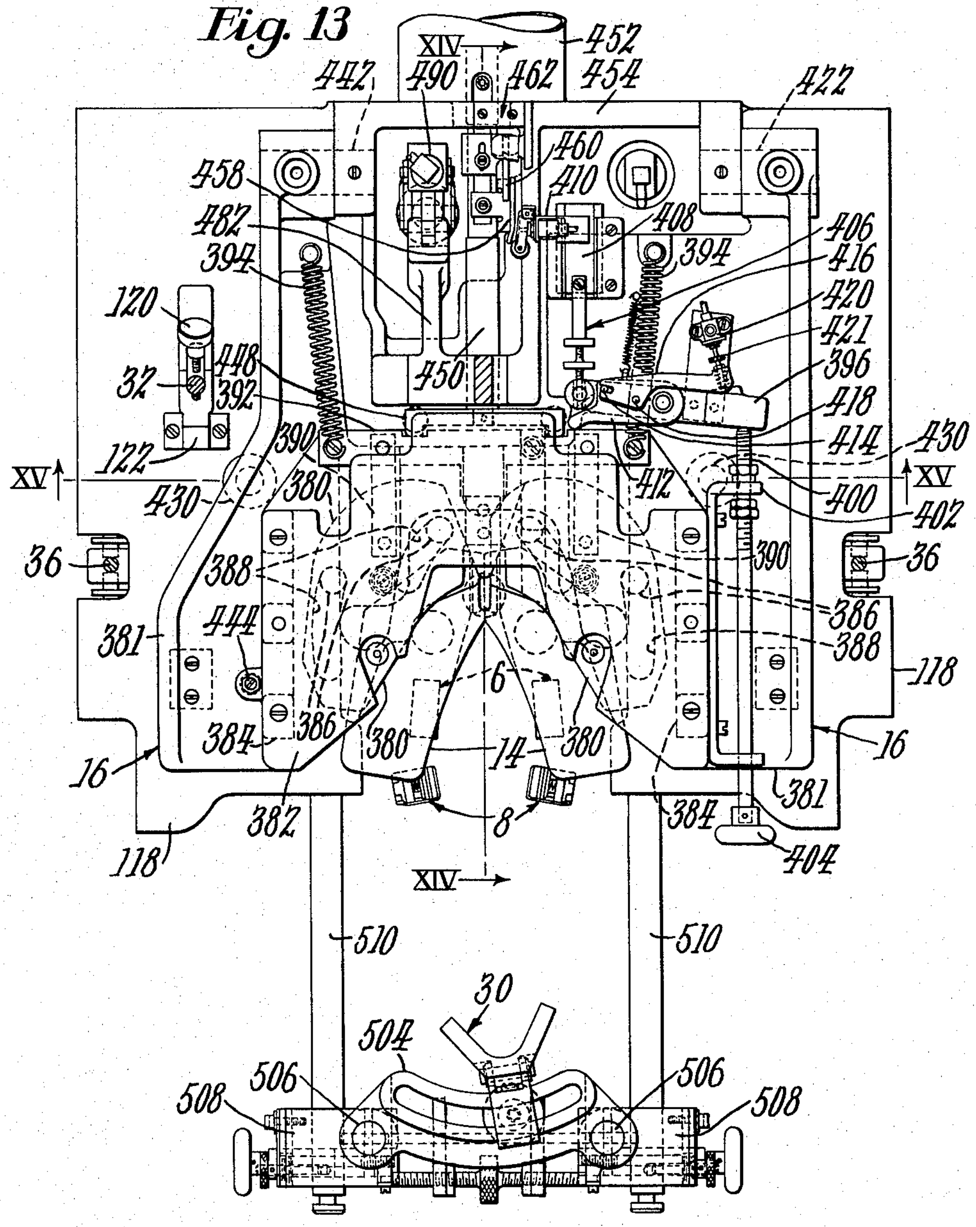
FIG. 13 is a plan view of the wiper head.

The wipers 14 are mounted in carriers 380 (FIGS. 13–15) which are slidably received on the wiper head 16 between a frame member 381 and a cover plate 382 suitably spaced above the head by spacers 384. The carriers are provided with cam rolls 386 on pins extending upwardly from the carriers and into cam slots 388 in the underside of the cover plate 382 to guide the carriers and wipers in their advancing and closing movements. The carriers 380 are connected by links 390 to a cross bar 392 which is urged rearwardly by two springs 394 extending from opposite ends of the bar to pins upstanding from the frame 381. The wiper mounting so far described is generally similar to that disclosed in U.S. Patent No. 3,022,527 granted February 27, 1962 in the name of A. W. Rockwell, Jr. et al. In a manner similar to that shown in said patent, provision is made for adjusting the initial position of the wipers. To this end a lever 396 pivoted on the head at 398 bears at one end against the cross bar 392 and at the opposite end bears against the end of an adjusting rod 400 threaded in a bracket 402 secured to the head. The adjusting rod 400 is provided with a knob 404 by which the rod is rotated to adjust the position of the lever 396 and hence also the lengthwise position of the wipers. The lever 396 is connected by an adjustable link 406 to a slide 408 mounted in guideways on the frame 381. The slide 408 has secured thereto a valve 410 which by virtue of the connection with the lever 396 follows any adjustment of the wipers. Also pivoted at 398 is an arm 412 having one end engaging the cross bar 392. A pin 414 carried by the arm 412 is received in the forked end of a lever 416 which is pivoted on a pin 418 extending upwardly from the lever 396 and through a clearance hole in the arm 412. The outer end of the lever 416 has a downturned ear 419 (FIG. 15) against which acts a spring carried in a bore in the adjacent end of the lever 396. The spring acts through the lever 416 to urge the arm 412 forward relative to the lever 396 upon forward movement of the cross bar 392. The ear on the lever 416 also has extending rearwardly therefrom a headed screw 421 adapted to engage the stem of a valve 420 (2D) so that when the cross bar 392 moves forward during the initial stages of the wiper advancing and closing movements the head of the screw 421 moves rearwardly to actuate the valve 420 for a purpose that will subsequently appear.

Figure 12:
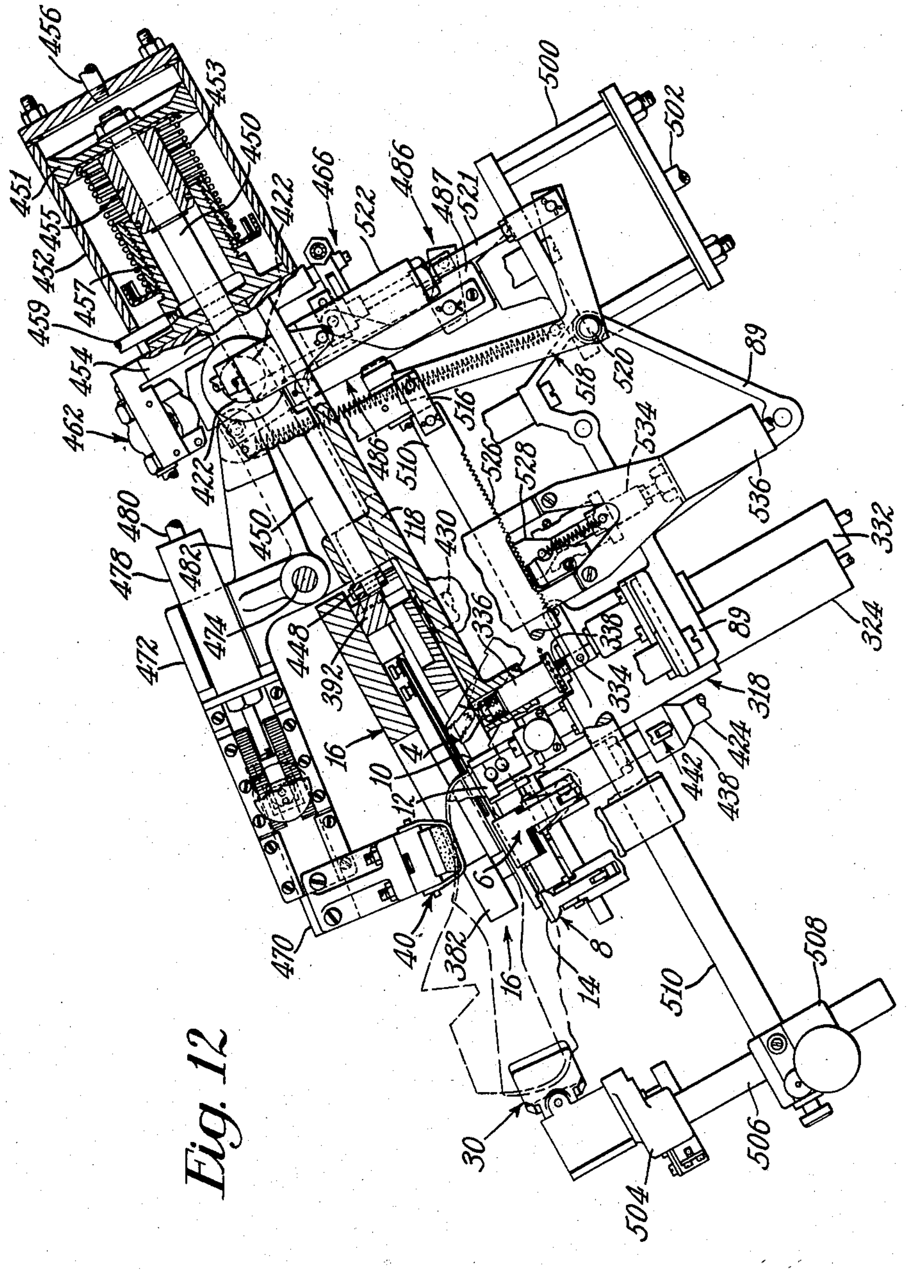
FIG. 12 is a view similar to FIG. 11 with parts shown in position after the down wiping operation of the wipers.
Figure 14:
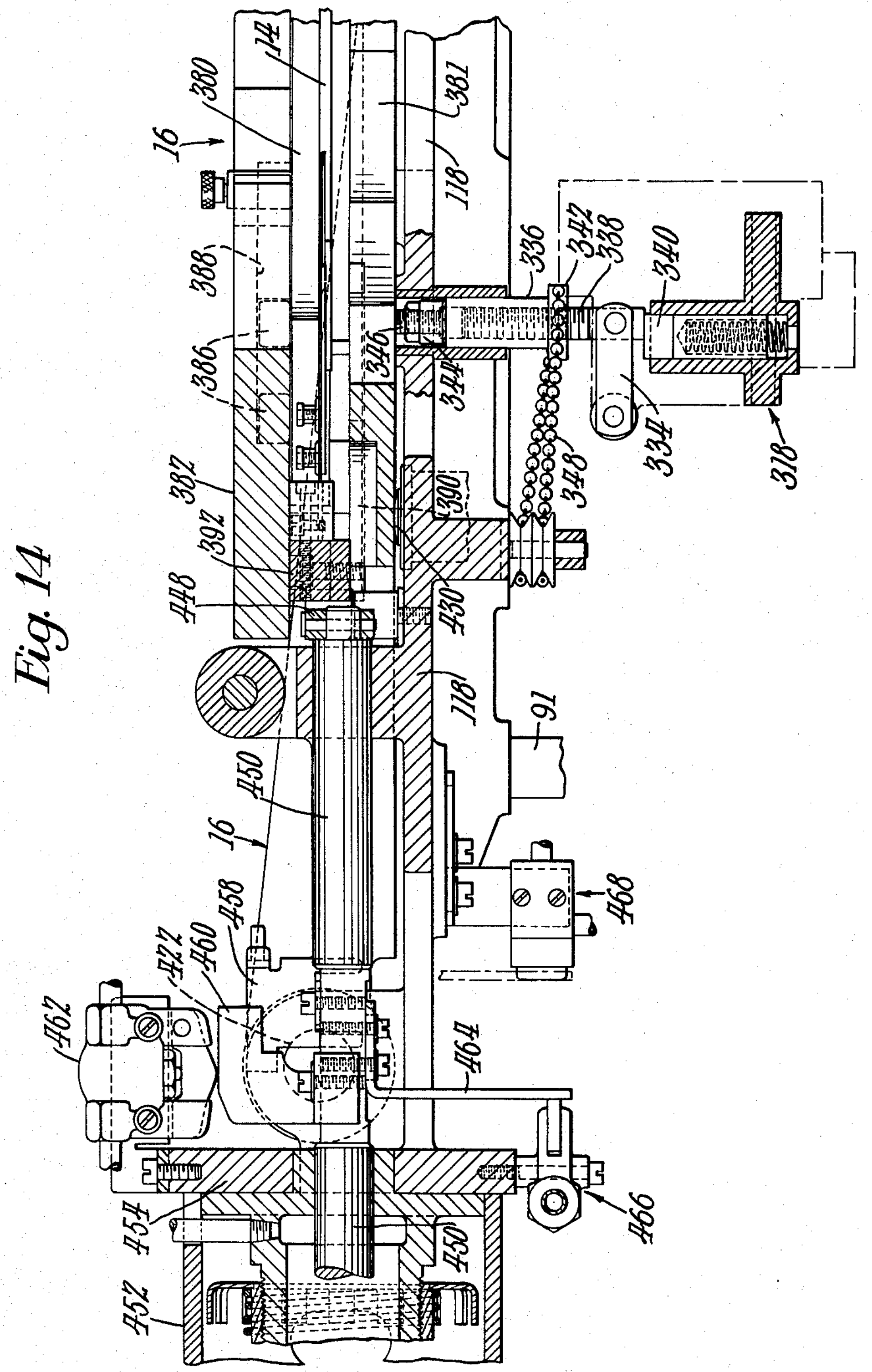
FIG. 14 is a section on line XIV—XIV of FIG. 13.
Figure 15:
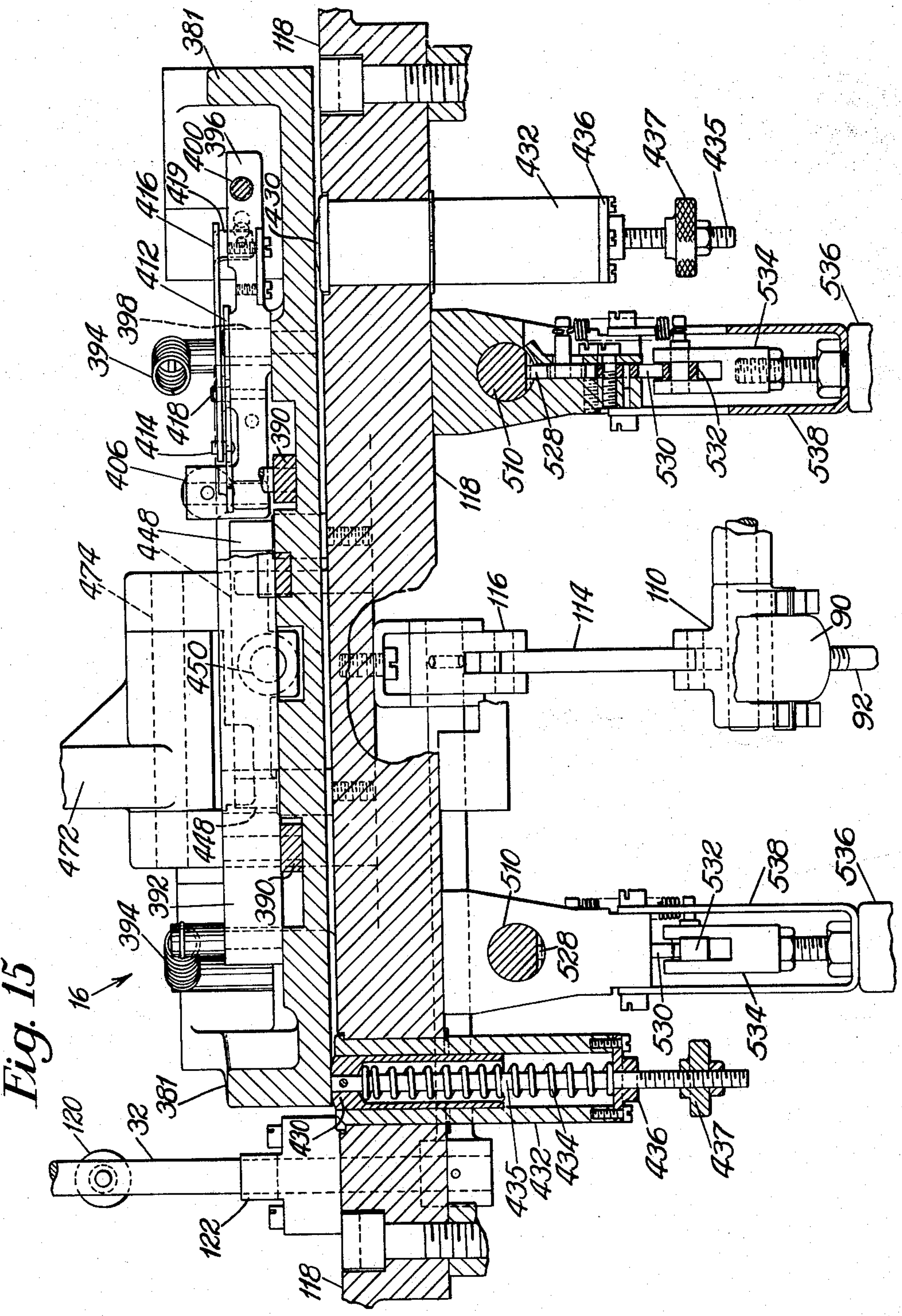
FIG. 15 is a section on line XV—XV of FIG. 13.
Figure 16:
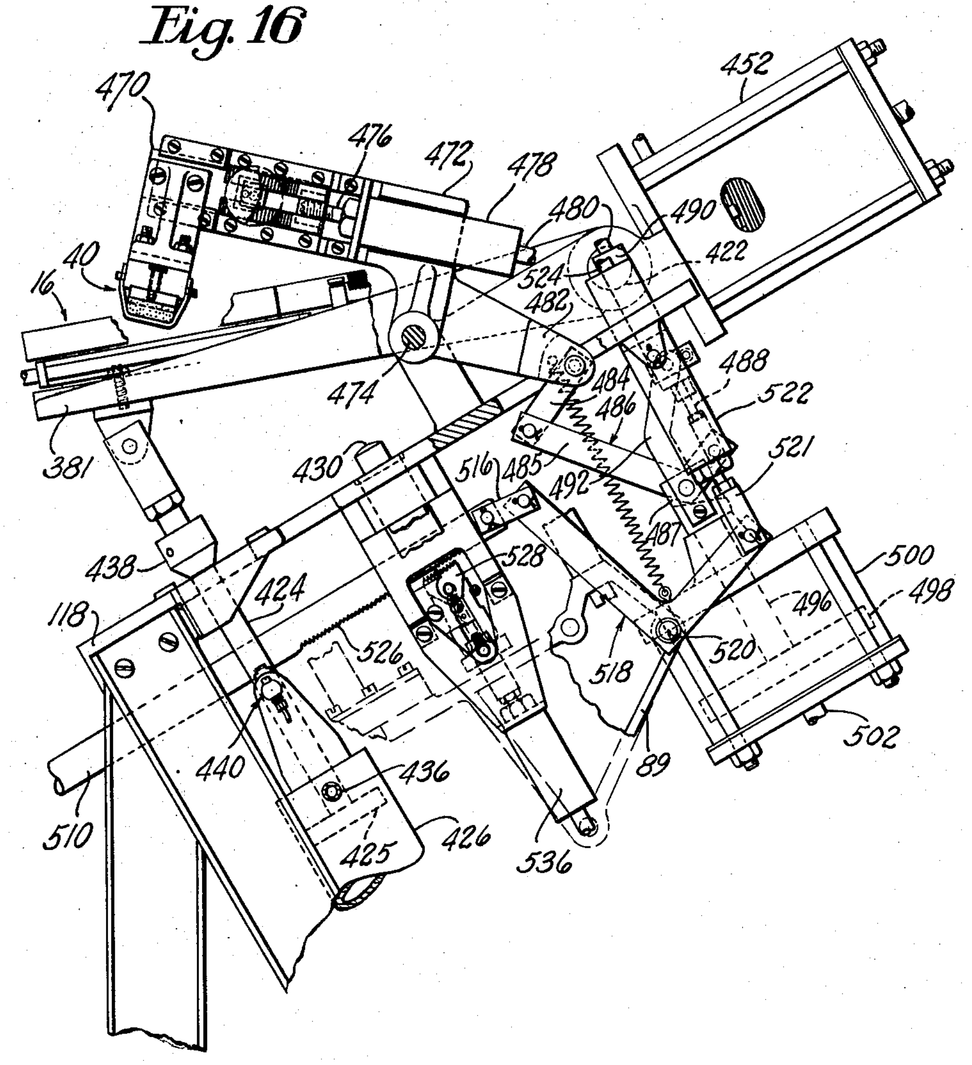
FIG. 16 is a view in side elevation illustrating particularly the toe clamp mechanism.

As previously mentioned, the wiper head 16 is adapted to be swung downwardly from the open position seen in FIGS. 1, 2 and 16 to the gaging position as seen in FIG. 11 where the operator can gage the position of the upper from the outline of the wipers 14 to determine need for correction. Thereafter, the head 16 is further moved down to wipe the upper about the forepart of the last to a closed position, as seen in FIGS. 12 and 14 where the wipers are at or below the plane of the bottom of the last in preparation for the advancing and closing movements of the wipers. To accomplish these downward movements the wiper head frame 381 is fulcrummed on two pins 422 carried by lugs upstanding from the top plate 118. At its forward end the frame 381 is connected at opposite sides by rods 424 to pistons 425 (FIGS. 2 and 3) received in a pair of cylinders 426 pivoted at their lower ends on lugs 427 upstanding from the plate 64. When the machine is at rest, the lower ends of the cylinders are pressurized from pipes 428 holding the pistons 425 and the wiper head 16 in its highest position seen in FIGS. 1, 2 and 16. After the shoe is placed in the machine, the wiper head 16 is moved down to its gaging position illustrated in FIG. 11. To this end the air is exhausted from the cylinders 426 from the pipes 428 and the head moves down under its own weight to the gaging position as determined by engagement of the underside of the head frame 381 with two yieldable stops 430. The stops are mounted for heightwise movements in sleeves 432 (FIG. 15) secured in the top plate 118. Each stop is urged upward by a spring 434 which bears at its lower end against a cap 436 fixed to the bottom of the sleeve 432. Each stop also has a depending rod 435 which extends through the end cap 436 and has an adjustable stop nut 437 threaded thereon to determine the highest position of the stop 430 by engagement with the end cap. The springs 434 exert sufficient upward force on the stops 430 to support the weight of the head 16 in its gaging position. During the downwiping movement of the wiper head 16 toward its final closed position, air is admitted to the upper ends of the cylinders 426 from pipes 436 to move the head down against the action of the springs 434 in the stops 430 until the bottom of the head frame 381 engages suitable pads on the top plate 118. During the downwiping movement of the head a pair of collars 438 (FIGS. 2, 3 and 16) on the rods 424 actuate a pair of valves 440 and 442 which respectively cause the toe and side grippers 4 and 6 to release the upper and causes the insole holddown 70 to be retracted. As the head approaches its lowermost position as set screw 444 (FIG. 13) in the head frame 381 actuates a valve 446 (FIG. 3) mounted in the top plate 118 to cause the wipers to commence their advancing and closing movements. To this end a cross bar 448 (FIGS. 13–15), adapted to engage the cross bar 392 only when the head is in its closed position, is fixed to the end of a piston rod 450 which extends forwardly from a piston 451 (FIG. 12) in a cylinder 452 secured to a flange 454 on the top plate 118. Upon actuation of valve 446, air is admitted to the cylinder 452 from a pipe 456 advancing the piston 451 against the action of a spring 453 to cause the wipers to advance and close in a path controlled by the cam slots 388 to wipe the upper inwardly over the edge of the shoe. As the wipers advance and close over the edge of the last bottom increased resistance is encountered to an extent often sufficient to stop the wiper movement momentarily until pressure building up in the cylinder 452 overcomes such resistance to advance the wipers again. In previous machines this often caused the wipers to jump forward in steps rather than smoothly. To avoid this effect, a collar 455 is also fixed on the rod 450 so as to operate in a buffing cylinder 457 (FIG. 12). Thus, during the advance of the wipers air is forced from the cylinder 457 by the advancing collar 455 through a pipe 459 and throttle valve 461 (FIG. 17*b*) and against a pressure controlled by a regulating valve 463.

During the inital wiper movement the lever 416 (FIG. 13) follows the advance of the cross bar 392 until the valve 420 is actuated by the screw 421 causing the insole holddowns to be depressed by admitting air to the cylinder 54 and the side pincers are caused to open by exhausting the cylinders 134 if these have not previously exhausted according to the setting of a manual valve 26. Actuation of valve 420 also causes the distributors 10 and 12 to be retracted by exhausting the cylinders 324, 332, and admitting air to the cylinders 352. At about the same time a cam plate 458 (FIGS. 13 and 14) fixed to the piston rod 450 actuates the valve 410 causing the ball grippers to open, and a cam plate 460 also fixed to the rod 450 moves beyond the actuator of a valve 462 causing the shoe support 2 to drop by exhausting the cylinder 62, the wipers having closed sufficiently at this time to support the shoe. A plate 464 fixed to the underside of the piston rod 450 also moves away from the actuator of a valve 466 which does not cause any action at this time but sets the stage for future action. During the final closing movement of the wipers, the plate 464 actuates a valve 468 which causes a heavy bedding pressure to be applied by the toe pad 40 by transferring the regulation of air pressure to the cylinder 500 from a valve 469 to a valve 471.

The toe pad 40 is mounted on the end of a slide 470 (FIG. 16) carried in guideways formed in a lever 472 pivoted on a pin 474 carried by lugs upstanding from the top plate 118. The slide 470 is connected to a piston rod 476 extending from a cylinder 478 secured to the arm. Upon admission of air to the end of the cylinder from a pipe 480, as soon as a start button 481 is actuated the toe pad is moved from its retracted position seen in FIG. 11, to an advanced position seen in FIG. 12 where the pad overlies the forepart of the shoe. The lever 472 has a rearwardly extending arm 482 which is connected by a link 484 to one arm 485 of a bell crank 486 pivoted on a member 487. The link and the arm 485 form a toggle which is broken as seen in FIGS. 11 and 16 when the toe pad is in its raised position. The other arm of the bell crank 486 is connected to a piston rod 488 extending down from a cylinder 490 carried on brackets 492 extending from the member 487. By admitting air to the upper end of the cylinder 490 from a branch of the pipe 480, the bell crank 486 is swung clockwise as seen in FIG. 16 until the toggle, formed by the bell crank and the link 484, is straightened moving the lever 472 down to engage the toe pad 40 with the shoe as seen in FIG. 12. The member 487 is fixed on the upper end of a piston rod 496 fixed to a piston 498 received in the cylinder 500 fixed to the bracket 89. As soon as the toggle is straightened air under a relatively light pressure, as controlled by the regulating valve 469, is admitted to the lower end of the cylinder 500 from a pipe 502 to cause the toe pad to exert a force sufficient to clamp the upper in place when the toe and slide grippers are released. When the wipers are fully closed actuation of valve 468 as above described causes greater air pressure to be admitted to the cylinder 500, as controlled by the regulating valve 471, causing the toe pad to exert a heavy pressure so the upper is pressed against the wipers by a heavy bedding pressure.

The heel rest 30 is mounted for adjustment on a member (FIGS. 2 and 11 to 13) 504 having an arcuate slot so the heel rest may be adjusted laterally to engage the heel ends of the variety of styles of shoes. The member 504 is carried on a pair of upright posts 506 which may be adjusted heightwise in blocks 508 to accommodate the heel heights of a variety of shoes. The blocks 508 are interconnected to move as a unit and are detachably secured on the ends of a pair of rods 510 which are mounted for sliding movements lengthwise of the shoe in lugs depending form the underside of the top plate 118. At its rear end one of the rods 510 is connected by a link 516 to the upstanding arm of a bell crank lever 518 which is pivoted at 520 on the bracket 89. The other arm of the lever is connected to a piston rod 521 extending down from a cylinder 522 pivoted on lugs depending from the top plate 118. Admission of air to the upper end of the cylinder from a pipe 524 causes the bell crank lever 518 to be swung clockwise from the position seen in FIG. 2 to that seen in FIG. 11 to move the heel rest 30 against the heel end of the shoe. As soon as the lasting cycle of the machine commences, the position of the heel rest is locked against movement. To this end, the rods 510 are provided with teeth 526 (FIGS. 11 and 12) adapted to be engaged by a lock member 528 having matching teeth. Each lock member is mounted for movement heightwise toward and away from its associated rod 510 as determined by a pair of bars 530 (FIG. 11) which at their upper ends are engaged with the lock members by matching inclined surfaces and which at their lower ends rest on opposite ends of an equalizing lever 532. This lever is pivoted on the upper end of a piston rod 534 extending from a cylinder 536 secured to a bracket 538 depending from one of the lugs supporting the rod 510. Upon admission of air to the lower end of the cylinders 536 from pipes 540 the lock members 528 are raised into engagement with the teeth 526 on their associated rods 510 through the bars 530. The lock members are capable of limited movement to align themselves with the teeth on the rods 510 by limited relative movement between the bars 530 permitted by the mounting on the equalizing lever 532. Upon exhaustion of air from the cylinders 536, springs (not shown) in the cylinders act to retract the lock members out of engagement with the rods 510 permitting return of the heel rest to its initial position.

Figure 17B:
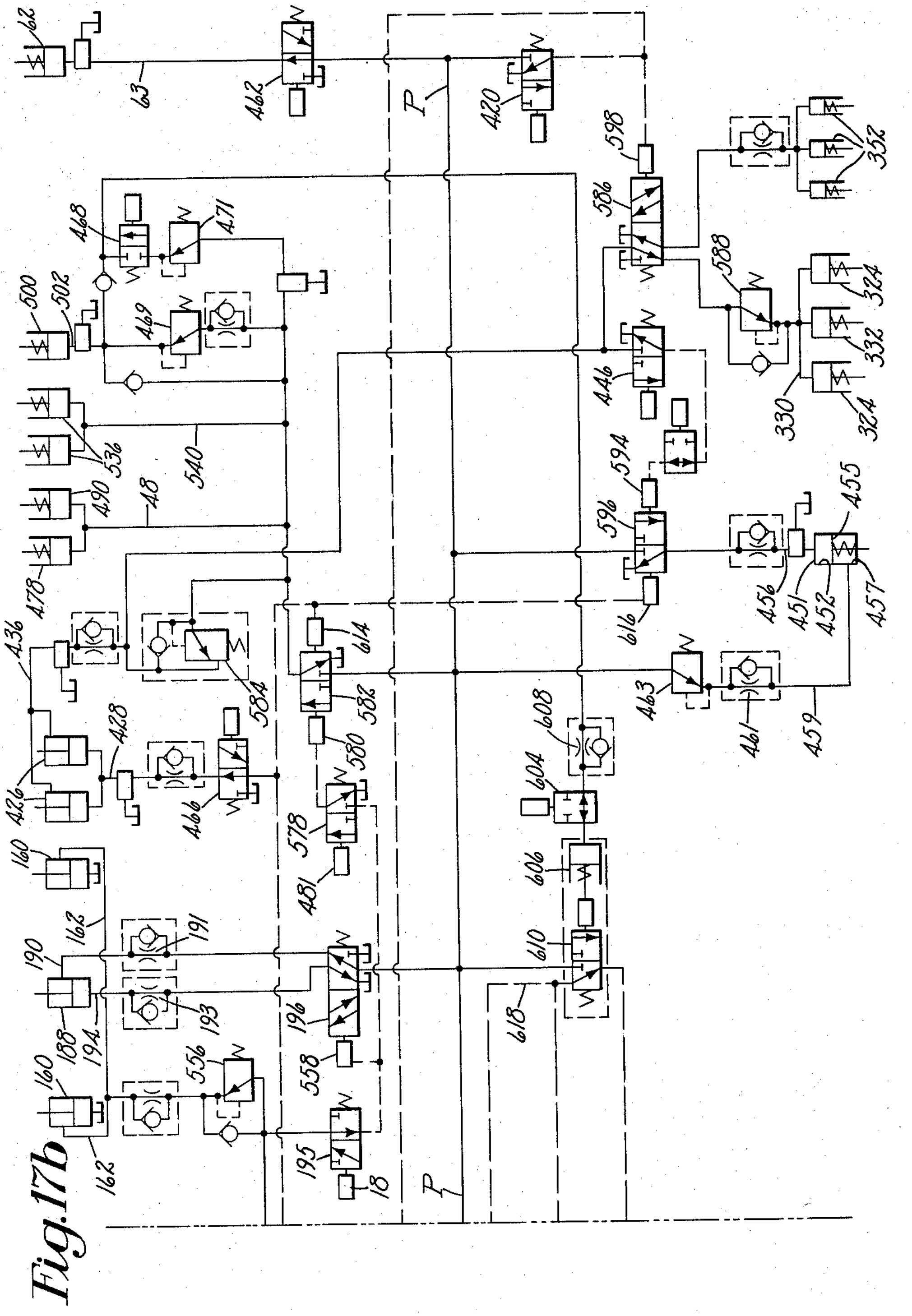

The general operation of the machine will now be described with particular reference to the pneumatic operating and control devices illustrated diagrammatically in FIGS. 17*a* and 17*b*. Air is supplied from a suitable source under a predetermined controlled pressure to a main pipe P. The various elements are shown in the diagram in positions assumed with the machine at rest as in FIGS. 1 and 2 ready to receive a last having an insole and upper assembled thereon. The wiper head is held in its open position by air supplied to the lower ends of the cylinders 426 from the pipe P, a pilot operated valve 550, and valve 466 through the pipe 428. The support 2 is held in its upper position by air supplied to the cylinder 62 from the pipe P, valve 462 and pipe 63. The side grippers are located in their upper receiving position (FIG. 3) by the action of the synchronizing cylinder 188 which has air admitted to its upper end from the pipe P through the valve 196 and pipe 190. The toe gripper is held in its upper position by air entering the lower end of the cylinder 102 from pipe P, valve 550 and pipe 104. The toe and side distributors 10 and 12 are held in their upper abutment forming positions by springs 320 (FIG. 10).

After placement of the shoe on the support 2 with the toe end located against the distributors and the margin of the upper in the grippers 4 and 6 the operator depresses a treadle T (FIGS. 1 and 2). This causes a valve 22 to shift and admit air to the toe gripper closing cylinder 84. A further depression of the treadle T causes a valve 5 to shift exhausting the insole holddown cylinder 54 so the insole holddowns 70 are raised by a spring to hold the edges of the insole snugly against the bottom of the last. Shifting of valve 5 also admits air to the cylinders 134 to close the side grippers 6 and directs air to a pilot 552 which shifts the valve 550. Air then exhausts through valve 550 from the lower end of the toe pull cylinder 102, and also exhausts from the cylinders 426 allowing the wiper head to drop of its own weight to the gaging position determined by the stops 430. Valve 550 also directs air: to the heel support cylinder 552 moving the support 30 in against the heel end of the shoe, to the cylinder 102 through a pressure regulating valve 554 and pipe 106 for pulling the upper over the toe end of the last, to the cylinders 160 through a pressure regulating valve 556 and pipe 162 for causing the side grippers to pull the upper at the sides uniformly as will appear, to a pilot 558 through the valve 195 (which may be shifted manually by push button 18) shifting valve 196 sending air from pipe P through the throttle valve 193 and pipe 194 to the synchronizing cylinder 188 and exhausting air from the other end of cylinder 188 through the pipe 190 and throttle valve 191 (thus controlling the pulling rate of both side grippers), to the side gripper adjustment brake cylinders 238 through a sequence valve 560, to a pilot 562 of a valve 564 which admits air to ball gripper closing cylinders 566 and through a sequence valve 568 and pressure regulating valve 570 to a ball gripper pulling cylinder 572. At this point the machine stops with the wiper head in gaging position and the upper pulled over the last. By manipulating the handles 32, 34 and 36, the operator may correct the position of the upper relative to the outline of the forepart of the last using the wipers as a visual gage. By actuating push button 25, the toe gripper may be opened and closed to change its position on the upper. By push button 18, the operator may relieve the tension on the upper uniformly at the sides to facilitate adjustment of the upper over the toe. If unable to correct fully the position of the upper, the operator may return the machine to its initial position by actuating a release button 574 which shifts a valve 576 to return the treadle valves 5 and 22 to their initial positions returning all mechanisms to their starting condition.

When satisfied with the position of the upper, the operator continues the machine cycle by actuating the start button 481. This shifts a valve 578 which directs air flowing from valve 550 through valve 195 to a pilot 580 which shifts a valve 582 adapted to commence the lasting cycle of the machine. Valve 582 then directs air from the pipe P to the cylinders 536 for locking the position of the heel clamp 30, to the cylinders 478 and 490 for moving the toe pad 40 out and down into engagement with the upper and through the pressure regulating valve 469 to the cylinder 500 which then applies a relatively light pressure on the toe pad sufficient to clamp the upper and last against subsequent action of the wipers. Air also flows from valve 582 through a sequence valve 584, and pipe 436 to the upper end of the cylinders 426 moving the wiper head down against the action of the yielding stops 430 causing the wipers 14 to wipe the upper heightwise over the last. Air also flows from the sequence valve 584 through a valve 586 and pressure regulating valve 588 to the cylinders 324, 332 to increase the distributor pressure as they are depressed by the action of the wipers. Also at this time downward movement of the wiper head depresses the plungers 336 to cause the distributors to be moved lengthwise away from the toe end of the last for spreading the upper along the underside of the wipers.

During the downward movement of the wiper head the collars 438 on the piston rods 424 connected to the wiper head actuate the valves 440 and 442. Valve 440 directs air from pipe P to a pilot 590 which returns the treadle valve 22 to its initial position exhausting cylinder 84 to open the toe gripper. Valve 442 directs air to a manual selector valve 590 which in the position shown is closed. If valve 590 were in the open condition air would flow to a pilot 592 to return the treadle valve 5 to its initial position pressurizing the cylinder 54 to depress the insole holddowns 70, exhausting the cylinders 134 to open the side grippers, and exhausting the pilot 552 of valve 550 without causing the valve to shift. At the end of the downward movement of the wiper head the wipers arrive at their lowermost position and the set screw 444 actuates the valve 446 which directs air available from sequence valve 584 to a pilot 594 which shifts a valve 596. This valve directs air from the pipe P through pipe 456 to the cylinder 452 to commence the wiper advancing and closing movements. As the piston 451 (FIG. 12) advances, air is exhausted from the cylinder 457 through pipe 459 and throttle valve 461 (FIG. 17*b*) against the pressure from pipe P regulated by valve 463 to ensure smooth action of the wipers as they close.

Shortly after the wipers begin their advancing movement the valve 420 (see also FIG. 13) is operated transmitting air from pipe P through selector valve 590 (if in the position shown) to pilot 592 to return treadle valve 5 to initial position. This exhausts the cylinders 134 to open the side grippers and pressurizes the cylinder 54 to retract the insole holddowns 70 as the wipers advance. Thus, it may be seen that depending on the setting of the selector valve 574 the insole holddowns and the side grippers are retracted either as the wipers approach the end of their downwiping movement operating valve 442, or just after the wipers begin their closing movement operating valve 420. Operation of valve 420 also transmits air to a pilot 598 shifting valve 586 exhausting the distributor pressure cylinders 324, 332 (FIG. 10) and pressurizing cylinders 352 (FIG. 9) to retract the distributors away from interference with the advancing wiper mechanism. Also during the wiper advance valve 410 is actuated by cam plate 458 transmitting air from pipe P to a pilot 600 to shift a valve 602 which exhausts cylinders 566 to open the ball grippers. At this time, valve 462 (FIG. 14) is operated by cam plate 460 exhausting cylinder 62 causing the support 2 to retract so the shoe is then supported only by the partially closed wipers. At the end of the closing movement of the wipers valve 468 is actuated by the plate 464 (FIG. 14) permitting air to pass to the toe pad bedding cylinder 500 from pressure regulating valve 471 at a much greater pressure than that previously flowing from the regulating valve 469. Air from valve 468 also flows through a manual selector valve 604 to a timing cylinder 606 at a rate controlled by a throttle valve 608. By adjusting the restriction of the throttle valve 608, the total time for operation of the timing cylinder can be varied. However, by closing the selector valve 604 operation of the timing cylinder may be prevented.

At the end of its movement the piston in the timing cylinder actuates an automatic release valve 610 which then transmits air from pipe P to a pilot 612 which returns valve 550 to its initial position. Air is then directed to a pilot 614 which returns valve 582 to initial position exhausing the cylinders 478, 490 and 500 to retract the toe pad, and exhausting also cylinders 536 to release the heel clamp locks. Valve 582 also directs air to valve 466 but its position at this time blocks passage of the air and also directs air to cylinder 102 through pipe 104 causing the toe gripper to rise. Valve 582 also exhausts air from the cylinder 522 permitting the heel clamp to retract, exhausts pilot 558 returning valve 196 which reverses the connections to the synchronizing cylinder 188 which returns the side grippers to their uppermost positions, the side gripper cylinder 160 also being on exhaust to permit this action, and also exhausts the cylinders 238 to release the handles 36. The pilot 562 is also exhausted allowing valve 564 to return to cause the ball grippers to rise. Valve 550 also directs air to a pilot 616 which returns valve 596 to exhaust cylinder 452 permitting the lower pressure from line 459 to act on the collar 455 (FIG. 12) to retract the wipers.

At the end of the wiper retracting movement valve 466 is returned by the plate 464 (FIG. 14) to its initial position transmitting air from valve 550 to the cylinder 426 through the pipes 428 raising the wiper head to its open position. Valve 420 also is returned to its initial position allowing valve 586 to return exhausting cylinders 352 so the distributors are raised by their springs. Valve 462 at this time also is returned admitting air to cylinder 62 to raise the support 2 to its initial position. This concludes the opening cycle of the machine permitting the lasted shoe to be removed and a shoe to be operated upon to be placed in the machine.

It will be appreciated that the above opening cycle is commenced at the end of the operation of the timing cylinder. Thus, if the above mentioned selector valve 604 had been in closed condition the machine also would have remained closed with the heavy bedding pressure being applied. To open the machine upon the setting of the selector valve 604, the operator actuates the release button 574 shifting valve 576 transmitting air through a pipe 618 and an open passage in the timing valve 610 to initiate the foregoing opening cycle of the machine as if the timing valve had been operated automatically.

Having thus described our invention what we claim as novel and desire to secure by Letters Patent of the United States is:

1. In a machine for operating on a shoe assembled on a last, a support for the last, a wiper head including wipers corresponding substantially to the outline of the last, said wiper head initially being in an open position exposing the support to facilitate placement of the shoe and being movable to a gaging position in which the wipers overlie the last and act as a visual gage defining the outline of the last hidden by the upper, means for bodily adjusting the position of the upper with respect to the last outline defined by the wipers, and means for moving the head intermittently from said open position to the gaging position and thereafter heightwise of the support to a closed position for wiping the upper over the last.

2. In a machine for operating on a shoe upper assembled on a last, a support for the last, grippers adapted to grip the margin of the upper and to be moved heightwise of said support for tensioning the upper over the last, means for individually adjusting said grippers heightwise and lengthwise of the last for varying the position of the upper on the last, a wiper head including wipers corresponding substantially to the outline of the last, said wiper head initially being in an open position substantially exposing the support and the grippers to facilitate placement of the shoe and being movable to a gaging position in which the wipers overlie the last to act as a visual gage relative to which the upper may be positioned by adjustment of said grippers, and means for moving the head intermittently from said open position to the gaging position and thereafter heightwise of the support to a closed position for wiping the upper over the last.

3. In a machine for operating on a shoe upper assembled on a last, a support for the last, a wiper head including wipers corresponding substantially to the outline of the last, power means connected to the head and operable initially in one direction to move the head to an open position spaced substantially from the support to facilitate placement of the shoe thereon, operator controlled means for releasing the power means permitting the head to move toward the support by the force of gravity, a yieldable stop mechanism for limiting the swinging movement of the head to a gaging position in which the wipers overlie the last and act as a visual gage defining the outline of the last, means for bodily adjusting the position of the upper with respect to the last outline defined by the wipers, and means for causing the power means to operate in the opposite direction to move the head against the action of said stop mechanism from the gaging position to a closed position for wiping the adjusted upper heightwise over the last.

4. In a machine for operating on a shoe upper assembled on a last, a support for the last, a wiper head including wipers corresponding substantially to the outline of the last, means mounting the head for heightwise swinging movement about a fulcrum substantially in the same plane as the support, power means connected to the head and operable initially in one direction for moving the head to an open position substantially away from the support to facilitate placement of the shoe, operator controlled means for releasing said power means for permitting the head to swing toward the support by the force of gravity, a yieldable stop mechanism for limiting the swinging movement of the head to a gaging position in which the wipers overlie the last and act as a visual gage defining the outline of the last, means for bodily adjusting the position of the upper with respect to the last outline defined by the wipers, and means for causing the power means to operate in the opposite direction to swing the head against the action of said stop mechanism from the gaging position to a closed position for wiping the adjusted upper heightwise over the last.

5. In a machine for operating on a shoe upper assembled on a last, a support for the last, a wiper head including wipers corresponding substantially to the outline of the last, double acting fluid motors connected to the head and operable initially in one direction to move the head heightwise away from the support to an open position substantially spaced from the support to facilitate placement of the shoe thereon, means for exhausting fluid from said motors permitting the head to move toward the support by the force of gravity, a yieldable stop mechanism for limiting the movement of the head to a gaging position in which the wipers overlie the last and act as a visual gage defining the outline of the last, means for bodily adjusting the position of the upper with respect to the last outline defined by the wipers, and means for causing said motors to operate in the opposite direction to move the head against the action of said stop mechanism from the gaging position to a closed position for wiping the adjusted upper heightwise over the last.

6. In a machine for operating on a shoe upper assembled on a last, a support for the last, a wiper head including wipers corresponding substantially to the outline of the last, means mounting the head for heightwise swinging movement about a fulcrum substantially in the same plane as the support, double acting fluid motors connected to the head and operable initially in one direction to swing the head heightwise away from the support to an open position to facilitate placement of the shoe on the support and operable in the opposite direction to swing the head heightwise toward the support, means for exhausting fluid from said motors permitting the head to swing toward the support by the force of gravity, a yieldable stop mechanism for limiting the swinging movement of the head to a gaging position in which the wipers overlie the last and act as a visual gage defining the outline of the last, means for bodily adjusting the position of the upper with respect to the last outline defined by the wipers, and means for causing the motors to operate in the opposite direction to swing the head against the action of said stop mechanism from the gaging position to a closed position for wiping the adjusted upper heightwise over the last.

7. In a machine for operating on a shoe upper assembled on a last, a support for the last, distributor plates mounted for yieldable heightwise movement from positions in which the plates extend above the support to form abutments for positioning the last, a wiper head including wipers corresponding substantially to the outline of the last, said wiper head initially being in an open position substantially spaced from the support to facilitate placement of the last on the support against said plates and being movable to a gaging position in which the wipers overlie the last and act as a visual gage defining the outline of the last, means for bodily adjusting the position of the upper with respect to the last outline defined by the wipers, and means for moving the head intermittently from said open position to the gaging position and thereafter heightwise of the support to a closed position for wiping the upper over the last and depressing said plates.

8. In a machine for operating on a shoe upper assembled on a last, a support for the last, distributor plates mounted for yieldable heightwise movement from positions in which the plates extend above the support to form abutments for positioning the last, means for adjusting the position of said plates lengthwise of the support to vary the lengthwise location of the last on the support, a wiper head including wipers corresponding substantially to the outline of the last, said wiper head initially being in an open position substantially spaced from the support to facilitate placement of the last on the support against said plates and being movable to a gaging position in which the wipers overlie the last and act as a visual gage defining the outline of the last, means for bodily adjusting the position of the upper with respect to the last outline defined by the wipers, and means for moving the head intermittently from said open position to the gaging position and thereafter heightwise of the support to a closed position for wiping the upper over the last and depressing said plates.

9. In a machine for operating on a shoe upper assembled on a last, a support for the last, distributors including a toe plate engageable with the toe end of the last, and side plates engageable with the opposite sides of the last at the toe end, means mounting said distributors for yielding heightwise movement from positions extending above the support forming abutments for positioning the toe end of the last on the support, means for adjusting the side distributor plates laterally of the support to accommodate different sizes and shapes of shoes to be operated upon, a wiper head including wipers corresponding substantially to the outline of the last, said wiper head initially being in an open position substantially spaced from the support to facilitate placement of the last on the support and against said plates and being movable to a gaging position in which the wipers overlie the last and act as a visual gage defining the outline of the last located on the support by the distributors, means for bodily adjusting the position of the upper with respect to the last outline defined by the wipers, and means for moving the head intermittently from said open position to the gaging position and thereafter heightwise of the support to a closed position for wiping the upper over the last and depressing said plates.

10. In a machine for operating on a shoe upper assembled on a last, a support for the last, distributors including a toe plate engageable with the toe end of the last, and side plates engageable with the opposite sides of the last at the toe end, means mounting said distributors for yielding heightwise movement from positions extending above the support forming abutments for positioning the toe end of the last on the support, means for individually adjusting the side distributor plates laterally of the support to accommodate different sizes and shapes of shoes to be operated upon and to vary the widthwise position of the last on the support, a wiper head including wipers corresponding substantially to the outline of the last, said wiper head initially being in an open position substantially spaced from the support to facilitate placement of the last on the support and against said plates and being movable to a gaging position in which the wipers overlie the last and act as a visual gage defining the outline of the last located on the support by the distributors, means for bodily adjusting the position of the upper with respect to the last outline defined by the wipers, and means for moving the head intermittently from said open position to the gaging position and thereafter heightwise of the support to a closed position for wiping the upper over the last and depressing said plates.

11. In a machine for operating on a shoe upper assembled on a last, a support for the last, distributors including a toe plate engageable with the toe end of the last, and side plates engageable with the opposite sides of the last at the toe end, means mounting said distributors for yielding heightwise movement from positions extending above the support forming abutments for positioning the toe end of the last on the support, means for adjusting the side distributor plates laterally of the support to accommodate different sizes and shapes of shoes to be operated upon, means for bodily adjusting the positions of said plates lengthwise of the support to vary the lengthwise location of the last on the support, a wiper head including wipers corresponding substantially to the outline of the last, said wiper head initially being in an open position substantially spaced from the support to facilitate placement of the last on the support and against said plates and being movable to a gaging position in which the wipers overlie the last and act as a visual gage defining the outline of the last located on the support by the distributors, means for bodily adjusting the position of the upper with respect to the last outline defined by the wipers, and means for moving the head intermittently from said open position to the gaging position and thereafter heightwise of the support to a closed position for wiping the upper over the last and depressing said plates.

12. In a machine for operating on a shoe upper assembled on a last, a support for the last, distributors including a toe plate engageable with the toe end of the last, and side plates engageable with the opposite sides of the last at the toe end, means mounting said distributors for yielding heightwise movement from positions extending above the support to form abutments for positioning the toe end of the last on the support, means for individually adjusting the side distributor plates laterally of the support to accommodate different sizes and shapes of shoes to be operated upon and to vary the widthwise position of the last on the support, means for adjusting the positions of said plates lengthwise of the support to vary the lengthwise location of the last on the support, a wiper head including wipers corresponding substantially to the outline of the last, said wiper head initially being in an open position substantially spaced from the support to facilitate placement of the last on the support and against said plates and being movable to a gaging position in which the wipers overlie the last and act as a visual gage defining the outline of the last located on the support by the distributors, means for bodily adjusting the position of the upper with respect to the last outline defined by the wipers, and means for moving the head intermittently from said open position to the gaging position and thereafter heightwise of the support to a closed position for wiping the upper over the last and depressing said plates.

13. In a machine for operating on a shoe upper assembled on a last, a support for the last, distributor plates mounted for yieldable heightwise movement from positions in which the plates extend above the support to form abutments for positioning the last, a wiper head including wipers corresponding substantially to the outline of the last, said wiper head initially being in an open position substantially spaced from the support to facilitate placement of the last on the support and against said plates and being movable to a gaging position in which the wipers overlie the last and act as a visual gage defining the outline of the last, means for bodily adjusting the position of the upper with respect to the last outline defined by the wipers, and means for moving the head intermittently from said open position to the gaging position and thereafter heightwise of the support to a closed position for wiping the upper over the last, said distributor plates yieldingly pressing the upper against the underside of said wipers while being depressed by the heightwise movement of the head.

14. In a machine for operating on a shoe upper assembled on a last, a support for the last, distributor plates mounted for yieldable heightwise movement from positions in which the plates extend above the support to form abutments for positioning the last, a wiper head including wipers corresponding substantially to the outline of the last, said wiper head initially being in an open position substantially spaced from the support to facilitate placement of the last on the support and against said plates and being movable to a gaging position in which the wipers overlie the last and act as a visual gage defining the outline of the last hidden by the upper, means for bodily adjusting the position of the upper with respect to the last outline defined by the wipers, and means for moving the head intermittently from said open position to the gaging position and thereafter heightwise of the support to a closed position for wiping the upper over the last, said distributor plates yieldingly pressing the upper against the underside of said wipers while being depressed by the heightwise movement of the head, and means operated by the movement of the head for moving the distributor plates lengthwise as they are depressed to spread the upper along the underside of the wipers.

15. In a machine for operating on a shoe upper assembled on a last, a support for the last, distributor plates mounted for yielding heightwise movement from positions in which the plates extend above the support to form abutments for positioning the last on the support, a wiper head including wipers corresponding substantially to the outline of the last, means for moving the head heightwise of the support to cause the wipers to wipe the upper over the last, and to depress said distributor plates yieldingly pressing the upper against the underside of said wipers, and means operated by the movement of the head for moving the distributor plates lengthwise to spread the upper along the underside of the wipers.

16. In a machine for operating on a shoe upper assembled on a last, a support for the last, distributor plates mounted for yielding heightwise movement from positions in which the plates extend above the support to form abutments for positioning the last on the support, means for adjusting the position of said plates lengthwise of the support to vary the lengthwise location of the last on the support, a wiper head including wipers corresponding substantially to the outline of the last, means for moving the head heightwise of the support to cause the wipers to wipe the upper over the last, and to depress said distributor plates yieldingly pressing the upper against the underside of said wipers, and means operated by the movement of the head for moving the distributor plates lengthwise to spread the upper along the underside of the wipers.

17. In a machine for operating on a shoe upper assembled on a last, a support for the last, a wiper head including wipers corresponding to the outline of the last, said head being movable from an open position toward the support for wiping the upper heightwise over the last, distributor plates normally extending heightwise above the support in the path of movement of the wipers to form abutments for positioning the last on the support and for pressing the upper outspread against the undeside of the wipers, a frame guided for lengthwise movement relative to said support, means mounting said plates on the frame for heightwise yielding movements in response to the wiping movement the wipers, a spring pressed plunger in the path of movement of said head, a link angularly disposed to the path of lengthwise movement of the frame and connecting the plunger and the frame, and means for moving the head toward the support to wipe the upper heightwise over the last while the distributor plates press the upper against the underside of the wiper, said plunger also being depressed by movement of the head to swing the link toward a parallel relation to the path of movement of the frame thereby causing lengthwise movement of the frame and plates for spreading the upper along the underside of the wipers.

18. In a machine for operating on a shoe upper assembled on a last, a support for the last, a wiper head including wipers corresponding to the outline of the last, said head being movable from an open position toward the support for wiping the upper heightwise over the last, distributor plates normally extending heightwise above the support in the path of movement of the wipers to form abutments for positioning the last on the support and for pressing the upper outspread against the undeside of the wipers, a frame guided for lengthwise movement relative to said support, means mounting said plates on the frame for heightwise yielding movements in response to the wiping movement of the wipers, a spring pressed plunger mounted in the path of movement of said head, a link connected at one end to the frame and angularly disposed to the path of lengthwise movement of the frame, means adjustably connecting the other end of the link to the plunger so as to vary the angle of disposition of the link for adjusting the lengthwise position of the plates with respect to the support, and means for moving the head toward the support to wipe the upper heightwise over the last while the distributor plates press the upper against the underside of the wiper, said plunger also being depressed by movement of the head to swing the link toward a parallel relation to the path of movement of the frame thereby causing lengthwise movement of the frame and plates for spreading the upper along the underside of the wipers.

19. In a machine for operating on a shoe upper assembled on a last, a support for the last, distributors including a toe plate engageable with the toe end of the last and side plates engageable with the opposite sides of the last at the toe end, means mounting said distributors for yielding heightwise movement from positions extending above the support to form abutments for positioning the toe end of the last on the support, means for adjusting the side distributor plates laterally of the support to accommodate different sizes and shapes of shoes to be operated upon, a wiper head including wipers corresponding substantially to the outline of the last, and means for moving the head heightwise of the support causing the wipers to wipe the upper over the last and to depress said distributor plates yieldingly pressing the upper against the underside of said wipers.

20. In a machine for operating on a shoe upper assembled on a last, a support for the last, distributors including a toe plate engageable with the toe end of the last and side plates engageable with the opposite sides of the last at the toe end, means mounting said distributors for yielding heightwise movement from positions extending above the support to form abutments for positioning the toe end of the last on the support, means for adjusting the side distributor plates laterally of the support to accommodate different sizes and shapes of shoes to be operated upon, a wiper head including wipers corresponding substantially to the outline of the last, means for moving the head heightwise of the support causing the wipers to wipe the upper over the last and to depress said distributor plates yieldingly pressing the upper against the underside of said wipers, and means operated by movement of the head for moving said distributor mounting means bodily lengthwise of the last to spread the upper along the underside of the wipers.

21. In a machine for operating on a shoe upper assembled on a last, a support for the last, distributors including a toe plate engageable with the toe end of the last and side plates engageable with the opposite sides of the last at the toe end, means mounting said distributors for yielding heightwise movement from positions extending above the support to form abutments for positioning the toe end of the last on the support, means for individually adjusting the side distributor plates laterally of the support to accommodate different sizes and shapes of shoes to be operated upon and to vary the widthwise position of the last on the support, a wiper head including wipers corresponding substantially to the outline of the last, and means for moving the head heightwise of the support causing the wipers to wipe the upper over the last and to depress said distributor plates yieldingly pressing the upper against the underside of said wipers.

22. In a machine for operating on a shoe upper assembled on a last, a support for the last, distribtuors including a toe plate engageable with the toe end of the last and side plates engageable with the opposite sides of the last at the toe end, means mounting said distributors for yielding heightwise movement from positions extending above the support to form abutments for positioning the toe end of the last on the support, means for individually adjusting the side distributor plates laterally of the support to accommodate different sizes and shapes of shoes to be operated upon and to vary the widthwise position of the last on the support, a wiper head including wipers corresponding substantially to the outline of the last, means for moving the head heightwise of the support causing the wipers to wipe the upper over the last and to depress said distributor plates yieldingly pressing the upper against the underside of said wipers, and means operated by the movement of the head for moving said distributor mounting means bodily lengthwise of the last to spread the upper along the underside of the wipers.

23. In a machine for operating on a shoe upper assembled on a last, a support for the last, distributors including a toe plate engageable with the toe end of the last and side plates engageable with the opposite sides of the last at the toe end, means mounting said distributors for yielding heightwise movement from positions extending above the support to form abutments for positioning the toe end of the last on the support, means for bodily adjusting the position of said distributor mounting means lengthwise of the support to vary the lengthwise location of the last on the support, means for adjusting the side distributor plates laterally of the support to accommodate different sizes and shapes of shoes to be operated upon, a wiper head including wipers corresponding substantially to the outline of the last, and means for moving the head heightwise of the support causing the wipers to wipe the upper over the last and to depress said distributor plates yieldingly pressing the upper against the underside of said wipers.

24. In a machine for operating on a shoe upper assembled on a last, a support for the last, distributors including a toe plate engageable with the toe end of the last and side plates engageable with the opposite sides of the last at the toe end, means mounting said distributors for yielding heightwise movement from positions extending above the support to form abutments for positioning the toe end of the last on the support, means for bodily adjusting the position of said distributor mounting means lengthwise of the support to vary the lengthwise location of the last on the support, means for adjusting the side distributor plates laterally of the support to accommodate different sizes and shapes of shoes to be operated upon, a wiper head including wipers corresponding substantially to the outline of the last, means for moving the head heightwise of the support causing the wipers to wipe the upper over the last and to depress said distributor plates yieldingly pressing the upper against the underside of said wipers, and means operated by the movement of the head for moving said distributor mounting means bodily lengthwise of the last to spread the upper along the underside of the wipers.

25. In a machine for operating on a shoe upper assembled on a last, a support for the last, distributors including a toe plate engageable with the toe end of the last and side plates engageable with the opposite sides of the last at the toe end, means mounting said distributors for yielding heightwise movement from positions extending above the support to form abutments for locating the toe end of the last on the support, means for bodily adjusting the position of said distributor mounting means lengthwise of the support to vary the lengthwise location of the last on the support, means for individually adjusting the side distributor plates laterally of the support to accommodate different sizes and shapes of shoes to be operated upon and to vary the widthwise location of the last upon the support, a wiper head including wipers corresponding substantially to the outline of the last, and means for moving the head heightwise of the support causing the wipers to wipe the upper over the last and to depress said distributor plates yieldingly pressing the upper against the underside of said wipers.

26. In a machine for operating on a shoe upper assembled on a last, a support for the last, distributors including a toe plate engageable with the toe end of the last and side plates engageable with the opposite sides of the last at the toe end, means mounting said distributors for yielding heightwise movement from positions extending above the support to form abutments for locating the toe end of the last on the support, means for bodily adjusting the position of said distributor mounting means lengthwise of the support to vary the lengthwise location of the last on the support, means for individually adjusting the side distributor plates laterally of the support to accommodate different sizes and shapes of shoes to be operated upon and to vary the widthwise location of the last upon the support, a wiper head including wipers corresponding substantially to the outline of the last, means for moving the head heightwise of the support causing the wipers to wipe the upper over the last and to depress said distributor plates yieldingly pressing the upper against the underside of said wipers, and means operated by the movement of the head for moving said distributor mounting means bodily lengthwise of the last to spread the upper along the underside of the wipers.

27. In a machine for operating on a shoe upper assembled on a last, a support for the last, grippers adapted to receive and grip the margin of the upper at opposite sides of the last positioned on the support, means for moving the grippers heightwise with respect to the support for tensioning the upper over the last, and synchronizing means operable during a substantial portion of the tensioning movements of the grippers for causing equal tensioning movements of the grippers at opposite sides of the last, said synchronizing means thereafter being retractable to an inoperative position to permit independent heightwise adjustment of the grippers.

28. In a machine for operating on a shoe upper assembled on a last, a support for the last, grippers adapted to receive and grip the margin of the upper at opposite sides of the last positioned on the support, means for moving the grippers heightwise with respect to the support for tensioning the upper over the last, synchronizing means operable during a substantial portion of the tensioning movements of the grippers for causing equal tensioning movements of the grippers at opposite sides of the last, said synchronizing means thereafter being movable to an inoperative position to permit independent heightwise adjustment of the grippers, and operator controlled means effective after the upper is tensioned for returning the synchronizing means to operative position to return the grippers to their initial positions thereby uniformly releasing the tension on the upper at opposite sides of the last.

29. In a machine for operating on a shoe upper assembled on a last, a support for the last, grippers adapted to receive and grip the margin of the upper at opposite sides of the last positioned on the support, synchronizing means engageable with said grippers and initially movable heightwise in one direction to position said grippers at the same heightwise upper receiving positions relative to the support, means for causing said grippers to grip the upper while positioned by the synchronizing means, said synchronizing means being thereafter movable at a controlled rate in the opposite direction toward a retracted position out of engagement with said grippers, and means for individually moving the grippers heightwise at a rate controlled by the retracting means whereby tension is applied to the upper equally at opposite sides of the last.

30. In a machine for operating on a shoe upper assembled on a last, a support for the last, grippers adapted to receive and grip the margin of the upper at opposite sides of the last positioned on the support, means for locating said grippers at the same heightwise upper receiving positions with respect to the support, means for causing said grippers to grip the upper while positioned by the locating means, means for retracting the locating means to an inoperative position after the grippers have gripped the upper, means for individually moving the grippers bodily heightwise after gripping the upper for tensioning the upper about the last, and means operable at the will of an operator for restoring the locating means to operative position to return the grippers to their initial positions for uniformly releasing the tension on the upper at opposite sides of the last.

31. In a machine for operating on a shoe upper assembled on a last, a support for the last, grippers adapted to receive and grip the margin of the upper at opposite sides of the last positioned on the support, arms, each individually connected to one of said grippers and to an individual power means, levers, each individually engageable with one of said arms, a single power means to which said levers are connected for simultaneous equal movements, said single power means being initially operative in one direction to engage said levers with said arms to move the grippers to uniform heightwise upper receiving positions, means for causing said grippers to grip the upper while in said receiving positions, means for operating said single power means in the opposite direction to retract said levers out of engagement with said arms, means for simultaneously operating said individual power means to move the grippers heightwise in a direction to tension the upper about the last, and operator controlled means effective after the upper is tensioned for operating said single power means in said one direction to re-engage the levers with said arms to return the grippers to their initial positions thereby uniformly releasing the tension on the upper at opposite sides of the last.

32. In a machine for operating on a shoe upper assembled on a last, a support for the last, grippers adapted to grip the margin of the upper at opposite sides of the last positioned on the support, arms each individually connected to one of said grippers and to an individual power means, synchronizing levers each individually engageable with one of said arms, a single power means to which said levers are connected for simultaneous equal movements, said single power means being initially operative in one direction to engage said levers with said arms to move the grippers to uniform heightwise upper receiving positions, means for causing said grippers to grip the upper while in said receiving positions, means for operating said single power means at a controlled rate in the opposite direction to retract said levers out of engagement with said arms, means for simultaneously operating said individual power means to move the grippers heightwise at a rate controlled by the movement of said levers in a direction to tension the upper equally at opposite sides of the last.

33. In a machine for operating on a shoe upper assembled on a last, a support for the last, grippers adapted to receive and grip the margin of the upper at opposite sides of the last positioned on the support, arms each individually connected to one of said grippers and to an individual power means, synchronizing levers each individually engageable with one of said arms, a single power means to which said levers are connected for simultaneous equal movements, said single power means being initially operative in one direction to engage said levers with said arms to move the grippers to uniform heightwise upper receiving positions, means for causing said grippers to grip the upper while in said receiving positions, means for operating said single power means at a controlled rate in the opposite direction to retract said levers out of engagement with said arms, means for simultaneously operating said individual power means to move the grippers heightwise at a rate controlled by the movement of said levers in a direction to tension the upper equally at opposite sides of the last, and operator controlled means effective after the upper is tensioned for operating said single power means in said one direction to re-engage the levers with said arms to return the grippers to their initial positions thereby uniformly releasing the tension on the upper at opposite sides of the last.

34. In a machine for operating on a shoe upper assembled on a last, a support for the last, grippers adapted to receive and grip the margin of the upper at opposite sides of the last positioned on the support, means for moving the grippers heightwise with respect to the support for tensioning the upper over the last, synchronizing means operable during a substantial portion of the tensioning movements of the grippers for causing equal tensioning movements of the grippers at opposite sides of the last, said synchronizing means thereafter being retractable to an inoperative position to permit independent heightwise adjustment of the grippers for varying the position of the upper on the last, a wiper head including wipers corresponding substantially to the outline of the last, said wiper head initially being in an open position, spaced from the support and the grippers to facilitate placement of the last on the support and insertion of the margin of the upper in the grippers, means for moving said wiper head from said open position to a gaging position in which the wipers overlie the last to act as a visual gage relative to which the upper may be positioned by adjustment of said grippers, and means effective after adjustment of the upper for moving said wiper head additionally from the gaging position heightwise of the support to a closed position for wiping the upper over the last.

References Cited in the file of this patent

UNITED STATES PATENTS

| | | |
|---|---|---|
| 2,210,586 | Kamborian | Aug. 6, 1940 |
| 2,706,823 | Jorgensen | Apr. 26, 1955 |
| 3,039,121 | Weinschenk | June 29, 1962 |